United States Patent
Fine et al.

(10) Patent No.: US 8,583,470 B1
(45) Date of Patent: Nov. 12, 2013

(54) PARTICIPANT UTILITY EXTRACTION FOR PREDICTION MARKET BASED ON REGION OF DIFFERENCE BETWEEN PROBABILITY FUNCTIONS

(75) Inventors: Leslie R. Fine, San Francisco, CA (US); Matthew J. Fogarty, Orinda, CA (US); Nanahari Phatak, Berkeley, CA (US)

(73) Assignee: Mindjet LLC, San Francisco, CA (US)

( * ) Notice: Subject to any disclaimer, the term of this patent is extended or adjusted under 35 U.S.C. 154(b) by 9 days.

(21) Appl. No.: 13/284,036

(22) Filed: Oct. 28, 2011

Related U.S. Application Data

(60) Provisional application No. 61/409,512, filed on Nov. 2, 2010.

(51) Int. Cl.
*G06Q 10/00* (2012.01)

(52) U.S. Cl.
USPC .................................................. 705/7.31

(58) Field of Classification Search
USPC .................................................. 705/7.31
See application file for complete search history.

(56) References Cited

U.S. PATENT DOCUMENTS

| | | | | |
|---|---|---|---|---|
| 5,608,620 | A * | 3/1997 | Lundgren | 705/1.1 |
| 6,606,615 | B1 * | 8/2003 | Jennings et al. | 706/45 |
| 7,130,777 | B2 * | 10/2006 | Garg et al. | 703/2 |
| 7,236,953 | B1 * | 6/2007 | Cooper et al. | 705/36 R |
| 7,249,077 | B2 * | 7/2007 | Williams et al. | 705/35 |
| 7,415,436 | B1 * | 8/2008 | Evelyn et al. | 705/37 |
| 7,519,564 | B2 * | 4/2009 | Horvitz | 706/12 |
| 7,542,881 | B1 * | 6/2009 | Billiotte et al. | 703/2 |
| 7,552,076 | B1 * | 6/2009 | Uenohara et al. | 705/36 R |
| 7,555,454 | B2 * | 6/2009 | Cooper et al. | 705/36 R |
| 7,565,313 | B2 * | 7/2009 | Waelbroeck et al. | 705/37 |
| 7,566,270 | B2 * | 7/2009 | Amaitis et al. | 463/22 |
| 7,590,554 | B2 * | 9/2009 | Chen et al. | 705/7.28 |
| 7,707,062 | B2 * | 4/2010 | Abramowicz | 705/7.31 |
| 7,742,968 | B2 * | 6/2010 | Guler et al. | 705/37 |
| 7,742,972 | B2 * | 6/2010 | Lange et al. | 705/37 |
| 7,865,418 | B2 * | 1/2011 | Uenohara et al. | 705/36 R |
| 7,880,741 | B2 * | 2/2011 | Proebsting et al. | 345/440 |
| 7,974,904 | B2 * | 7/2011 | Frischer | 705/36 R |

(Continued)

FOREIGN PATENT DOCUMENTS

WO    WO0186532 A1 * 11/2001 .............. G06F 17/60

OTHER PUBLICATIONS

Chen, Kay-Yut et al., Predicting the Future Information Systems Frontier, vol. 5, No. 1, 2003.*

(Continued)

*Primary Examiner* — Scott L Jarrett
(74) *Attorney, Agent, or Firm* — Marc P. Schuyler

(57) ABSTRACT

The present disclosure provides a system that implements a prediction market, used for making forecasts and, more particularly, for extracting participant utility. One or more forecasts of a specific participant or subset of participants are taken, and a measure of divergence of these forecasts from a group as a whole (or for that matter, any group) is calculated. This divergence may then later be employed in the prediction market (e.g., for present or future forecasting). For example, if it is known that "sales managers" are consistently too liberal in forecasting product release dates than others within a company, this tendency may be compensated for or used in a variety of manners, such as automatically correcting predictions or forecasts for perceived error, automatically discarding or modifying predictions, or automatically generating "virtual" predictions for future events. Other actions may also be taken.

32 Claims, 6 Drawing Sheets

(56) References Cited

U.S. PATENT DOCUMENTS

| | | | |
|---|---|---|---|
| 8,229,824 B2* | 7/2012 | Berg et al. | 705/36 R |
| 8,275,695 B2* | 9/2012 | Lange et al. | 705/37 |
| 8,341,065 B2* | 12/2012 | Berg et al. | 705/37 |
| 8,370,249 B2* | 2/2013 | Lange et al. | 705/37 |
| 8,380,595 B1* | 2/2013 | Fogarty | 705/35 |
| 8,396,777 B1* | 3/2013 | Fine et al. | 705/36 R |
| 2003/0078829 A1* | 4/2003 | Chen et al. | 705/10 |
| 2004/0176994 A1* | 9/2004 | Fine et al. | 705/10 |
| 2005/0114161 A1* | 5/2005 | Garg et al. | 705/1 |
| 2006/0117303 A1* | 6/2006 | Gizinski | 717/136 |
| 2007/0136429 A1* | 6/2007 | Fine et al. | 709/206 |
| 2007/0198387 A1* | 8/2007 | Uenohara et al. | 705/36 R |
| 2007/0250429 A1* | 10/2007 | Walser et al. | 705/37 |
| 2008/0288209 A1* | 11/2008 | Hunt et al. | 702/179 |
| 2009/0073174 A1* | 3/2009 | Berg et al. | 345/442 |
| 2009/0076939 A1* | 3/2009 | Berg et al. | 705/37 |
| 2009/0254475 A1* | 10/2009 | Pennock et al. | 705/39 |
| 2010/0179930 A1* | 7/2010 | Teller et al. | 706/12 |
| 2011/0137848 A1* | 6/2011 | Stephens, Jr. | 706/52 |

OTHER PUBLICATIONS

Wolfers, Justin et al., Interpreting Prediction Market Prices as Probabilities Jan. 8, 2007.*

Pennock, David M. et al., The Power of Play: Efficiency and Forecast Accuracy in Web Market Games NEC Research Institute Technical Report, 2000-168, Feb. 17, 2001.*

Chen, Kay-Yut et al., Forecasting Uncertain Events with Small Groups HP Laboratories, Jun. 25, 2001.*

Myung, In Jae et al., Maximum Entropy Aggregation of Expert Predictions Management Sience, vol. 42, No. 10, Oct. 1996.*

Plott, Charles R. et al., Information Aggregation Mechanisms: Concept, Design, and Implementation for a Sales Forecasting System, California Institute of Technology, Mar. 2002.*

Ledyard, John et al., An Experimental Test of Combinatorial Information Markets Dec. 2007.*

Almeida, Daniell, The Relevancy of Group Expertise for the Accuracy of a Prediction Market Erasmus School of Economics, May 2010.*

Ullah, Aman, Entropy, divergence and distance measures with econometric applications Journal of Statistical Planning and Inference, vol. 48, 1996.*

Marzgan, Caren, The ROC Curve and the Area under It as Performance Measures Weather and Forecasting, vol. 19, 2004.*

Bao, Young et al., Comparing Density Forecast Models Journal of Forecasting, vol. 26, 2007.*

CFO and Crowdcast Launch Financial Prediction Market PRWeb, Jul. 16, 2009.*

Harnessing Collective Intelligence to Improve Strategic Planning Crowdcast, Whitepaper, 2010.*

Crowdcast.com web pages Crowdcast, Jul. 2009.*

Chen, Kay-Yut et al., Eliminating Public Knowledge Biases in Information Aggregation Mechanisms HP Laboratories, Mar. 21, 2003.*

Schrieber, Jared M., The Application of Prediction Markets to Business Massachusetts Institute of Technology, Jun. 2004.*

* cited by examiner

```
                                                                    1301
Bet Log
 #   Tmstmp          UID   Loc.    x    y   Result  Bet      Return
(1)  0411080812.11   21    123J7   38   41  43      $100     $0
(2)  0411080819.06   7     123K1   20   30  22      $100     $115
(3)  0411080951.77   11    123J7   40   50  43      $175     $212.50
(4)  0421115622.67   7     123K1   40   50  43      ($100)   $115
                      o                o
                      o                o
                      o                o
(i)  0728081641.63   44    074D8   120  125         $100     $120
```

US 8,583,470 B1

PARTICIPANT UTILITY EXTRACTION FOR PREDICTION MARKET BASED ON REGION OF DIFFERENCE BETWEEN PROBABILITY FUNCTIONS

This application is a conversion of U.S. Provisional Application 61/409,512, filed on Nov. 2, 2010 on behalf of inventors Leslie R. Fine, Matthew J. Fogarty and Nanahari Phatak, for "Participant Utility Extraction For Prediction Market." This provisional application is incorporated herein by reference.

The present disclosure relates to computational analysis and software; more particularly, the present disclosure provides a system that implements a prediction market, used for making forecasts based on the views of a group of individuals, and related methods, devices and software.

BACKGROUND

The wisdom of crowds can often provide better decision-making capabilities than the best guesses of experts. Automated systems have therefore evolved to offer predictive tools to institutional clients based upon the forecasts of a group of individuals; often implemented as software for sale to (or as a service for) institutional clients, a "prediction market" is typically relied upon to poll a group of individuals (i.e., "participants") and use an averaged version of the group view to predict the outcome of one or more events. The "polling" can take various forms, such as permitting each participant to make a bet, trade a stock, provide an opinion, or engage in some other type of behavior or response that provides data that will serve as the basis for assessing group belief.

For example, a prediction market may be implemented by enterprise software within a large company, the software being used to poll a diverse group of executives as to a revenue forecast, or the real roll-out date of a product in development, or other type of "event." The polling is often implemented in this context as either a game or virtual stock market, that is, a system that offers rewards or prizes to participants who make the right prediction; through the reward and continued participation, the prediction market seeks to elicit the participants' true, unbiased opinion as to the likely outcome of the event. Naturally, this example is not limiting, and many other examples of prediction markets exist—for example, a predication market can be used to accurately predict odds of a sporting event, such as a football game. Many different types of systems exist, with events being modeled as simple Boolean predictions ("I believe revenue this year will be greater than $1 Million US"), or using other forms of "virtual stocks" such as ranges ("I believe revenue this year will be between $1 Million US-$1.2 Million US"). Many other examples exist, and nearly any type of future event can be modeled using a prediction market. By aggregating together many such beliefs or forecasts, a prediction market typically seeks to compute the aggregate beliefs of a crowd, which if collected properly, are believed to be statistically more accurate than the belief of any one individual.

Generally speaking, prediction market systems are successful for their intended purposes, but often do have some limitations. For example, most systems permit forecasting of only the modeled event, that is, based on the actually collected views of all participants, and it may be difficult or impossible to segment the views of a particular class of participants, especially since the forecasts of that class may be dependent on the views of other classes. In addition, these systems typically can only predict results based on collected forecasts, that is, it may be impossible to understand what a specific group "might predict" presented with a hypothetical event for which no forecasts have yet been collected.

What is needed is a way to extract a measure of participant utility, that is, a measure of motivations and drives, in a prediction market. Such a solution would, generally speaking, facilitate more flexible prediction services and software, and additional applications of prediction market software. The present invention satisfies these needs and provides further related advantages.

BRIEF DESCRIPTION OF THE DRAWINGS

in FIG. 1, dashed-line blocks indicate optional features, while a "dotted line" block identifies a calculation engine that can be implemented on a single machine, or across a private or public network.

FIG. 3A illustrates that each of these things can be further broken down into other dependencies (e.g., sales and cost for a particular month or quarter, present or past), and organized by any desired grouping, for example, country (US or Mexico), region (North America), Month, Quarter, Year, and so forth.

FIG. 4 shows a number of other elements that can be used to manage the prediction market, including a calculation engine 415, a prediction tool 417 (used by individual participants to make their predictions for one or more events supported by the relational database), and a viewing and reporting tool 419 (also called an "executed dashboard" in some embodiments).

FIG. 11 indicates a number of fields that may be selected for some implementations of such an enrollment-based system. In other implementations, participant profiles may also be used for some security functions (much of this functionality may be handled through server policies or lists, with assistance for example from an enterprise LDAP directory, or PKI membership and revocations list, or similar systems or protocols).

Figure 1:
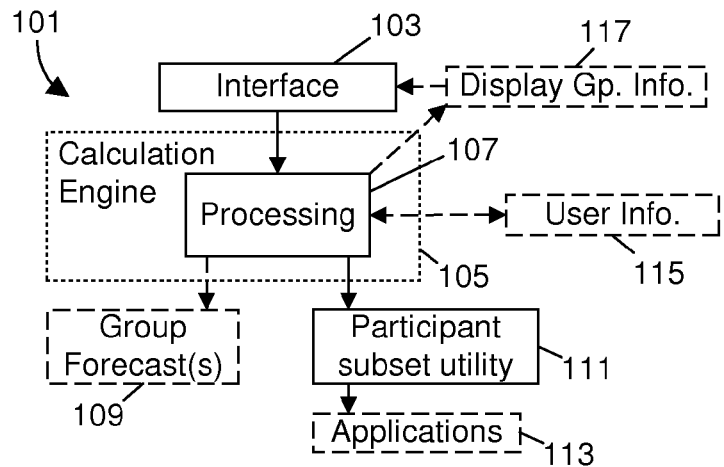
FIG. 1 shows one embodiment of a system that extracts utility of a participant subset (i.e., one or more participants) from a prediction market or similar system.

The invention defined by the enumerated claims may be better understood by referring to the following detailed description, which should be read in conjunction with the accompanying drawings. This description of one or more particular embodiments, set out below to enable one to build and use various implementations of the invention or inventions set forth by the claims, is not intended to limit the enumerated claims, but to exemplify their application to certain methods and devices.

The description set out below exemplifies (i) a method of extracting utility of a participant or group of participants from a prediction market database that represents the views of a larger group, (ii) a prediction market system, implemented as a database that defines a prediction market through a series of closely-related databases (for example, that store records of participant predictions for one or more events, and that then models predictions for those events as a probability function based on the participant predictions), (iii) a series of related methods, including methods that aggregate participant inputs together to generate a cumulative probability function that can be used to model event likelihood, and (iv) related systems, methods and devices, including a prediction system as well as software stored on machine readable media that can be used to perform the aforementioned methods. The invention, however, may also be applied to other systems, methods and devices as well.

DETAILED DESCRIPTION

This disclosure provides a way to extract a measure of utility of an individual participant or class of participants. In embodiments discussed below, one or more forecasts of a specific participant or subset of participants are taken, and a measure of divergence of these forecasts from a group as a whole (or for that matter, any group) is calculated. This measure may then be used for a wide variety of purposes and applications. For example, if it is known that "sales managers" are consistently more liberal than others at forecasting product release dates than others within a company, this information may be returned by a prediction market system and used for a variety of purposes, including the following:

(a) predictions for future events may be automatically corrected for the statistical error;
(b) predictions for the participant subset may be discarded, or not collected for specific future events;
(c) "virtual" predictions for the participant or subset may be generated based on other data, without event-specific forecasts being obtained, or
(d) other actions may be taken.

It should be understood that "divergence" as used above can include any algorithmic measure of how the forecasts, utility, views or beliefs of a participant subset stack up against the larger group of participants; for example, in specific embodiments presented below, divergence may be computed by (1) using software to generate a first "T-distribution" representing views of the participant subset, (2) using software to generate a second T-distribution representing the views of the group as a whole, (3) determining the "crossing points" represented by mismatch of the probability curves represented by these distributions, and (4) determining a difference measure based on these crossing points; many other alternatives exist, however, for generating a measure of divergence, such as calculating a product, difference, sum or other function of two distributions, using something other than a probability distribution, and any other method or means for determining how the views of the one group of (1 or more) participants differ from the views of another group of (1 or more) participants. With regard to the appendix stated below, expressly contemplated embodiments are based on divergence measures which implement some or all of the mathematical techniques and other principles discussed in that appendix, which may be further restated in the detailed description of applications which claim the benefit of this document. Also, without limitation, specifically contemplated embodiments employ distributions other than T-distributions and use algorithmic measures that functionally operate on the distributions to return a result that reflects divergence of the first group from the second.

In a more detailed, optional aspect of this methodology, the views of the group as a whole may be made available to each participant as they seek to make a "bet" (i.e., interactively enter data representing a forecast of an event). That is to say, each new bet inherently reflects beliefs of the new participant; by providing access by a new participant to data that represents an existing forecast model for the event, the methodology presented above can be used to measure the new participant's reactionary beliefs when presented with the forecast-to-date of the group as a whole. The provision of access to group data may be inherent (e.g., reflected by the pricing of the bet to the new participant, or effected via explicit display to the participant of existing group data (e.g., a probability curve representing the aggregation of forecasts to date can be displayed on the participant's browser at the time of evaluating a possible new bet). It should be noted that in the case of the "first participant," the forecast to date may optionally be a seeded probability model representing possible event outcome. Notably, however, it is expressly desired for some embodiments of the methodology introduced above to provide each new participant with a probability model of aggregated forecasts-to-date, so that the new bet reflects an understanding of forecasts-to-date and thus indeed reflects biases and utility based on divergence from the group as a whole, given current information available in the prediction market at the time the new bet is made. In some implementations discussed below, currency and the time dependence of each new bet is effected by maintaining a database of bets or wagers, and time stamping each new bet at the time it is placed.

The various methods introduced above may be implemented on a single machine, across a network, in software, or on a service bureau basis, e.g., for-fee services provision to institutions (e.g., companies, governmental entities and so forth).

With these principles in mind, this disclosure will proceed to introduce specific systems and embodiments.

I. Introduction and System Overview.

One embodiment is a system that is used to create forecasts for a corporate, governmental or other entity; the system could be a network consisting of a diverse set of machines within a corporation, but this disclosure is not so limited. FIG. 1 is a block diagram 101 which illustrates processing implemented by such a system. In particular, the system may include an interface 103 for receiving participant data and a calculation engine 105, which processes the data vis-à-vis an existing group forecast, as generally indicated by reference numeral 107. The system can perform two types of general processing upon participant data, represented by function blocks 109 and 111. First, per block 109, a new group forecast (or probability function representing group opinion) can be calculated which reflects the new participant data; that is to say, if group data represents n previous participants, a new group forecast (e.g., a new probability model) representing the bets of n+1 participants, including the new participant bet, can be prepared. Second, per block 111, a measure of utility of the new participant can be extracted by calculating divergence of the new participant's bet from the previous forecast. In a model where each forecast is represented by a probability model (such as a normal distribution), the new bet can optionally be converted to a similar format probability model (e.g., a normal distribution) to simplify computation, and the two distributions can be combined in a manner to return a result representing divergence, e.g., their dissimilarity, if any. Extracted utility can then be aggregated with other, select participants (based on profiles associated with those participants) and used in a variety of applications, denoted by reference numeral 113. Some of these applications will be further discussed below. As indicated by dashed-line (optional) block 115, information on the new participant can be provided to the system, for example, from a registration or other database, and associated with extracted utility, with updated records being stored in a database (e.g., the registration or other database as appropriate).

As mentioned above, in one embodiment, information on the previous group forecast can be made available to the new participant prior to placing a bet; in this manner, divergence of the bet of the new participant from the accessed group information can be used to decipher reaction of the new participant to the views of the group (e.g., to identify how the participant values the previous view of the group). In one embodiment, this information may be accessed by displaying on the screen of a computation device a probability curve or similar data that expressly reveals the group forecast; in a second embodiment, access of this information may be implicit, e.g., by allowing the new participant to price bets for different forecasts to indirectly measure the existing group forecast before placing the bet. This optional functionality is illustrated in FIG. 1 using dashed-line function block 117.

In still more detailed implementations, the system may include a set of one or more servers which run software to poll participants via their individual computers. The server(s) maintain information to seed an initial prediction market, a database of participants, a database of "bets" (or equivalently, "forecasts" or "trades") that are used to build an aggregate forecast, a reporting module (also called an "executive dashboard") and a database that includes permissions and fields associated with each individual participant, such as job title, pay grade, age, department, name, employee number, participant name, password and other identifiers that can be used to identify or group participants. It should be noted that each of these elements are optional, that is, the system can be implemented on a single machine, or without requiring participant registration or tracking of participant bets after then have been made; the system can instead just maintain a running probability distribution that factors in new wagers without any ability to track the specific wager a later point in time.

One contemplated embodiment permits participants to "buy back" their bets, potentially at a new price, and to this effect, the system in FIG. 1 may be implemented as a relational database, that is, where at least one database is used to track individual bets, indexed by time if desired. A thorough description of one implementation of one such relational database is also given in U.S. patent application Ser. No. 12/478,738, filed on behalf of inventors Leslie R. Fine, Matthew J. Fogarty and Matthew Shore for "Prediction Market Database, Related Methods, Devices And Systems" on Jun. 4, 2009, assigned to Crowdcast, Inc.; this prior application is hereby incorporated by reference as though set forth herein. Generally speaking, the system of FIG. 1 may also be implemented in such a system, with credentials (e.g., public key infrastructure-based, LDAP directory based, NT credential-based, or using some other form of authentication capability) being used to track bets, viewing permissions and other features of the relational database. Again, the use of such credentials for security is optional, but by permitting participants to "buy back" their bets at later points in time, a system such as the one depicted in FIG. 1 is thought to provide greater flexibility in dynamically responding to new information available to participants.

Figure 2:
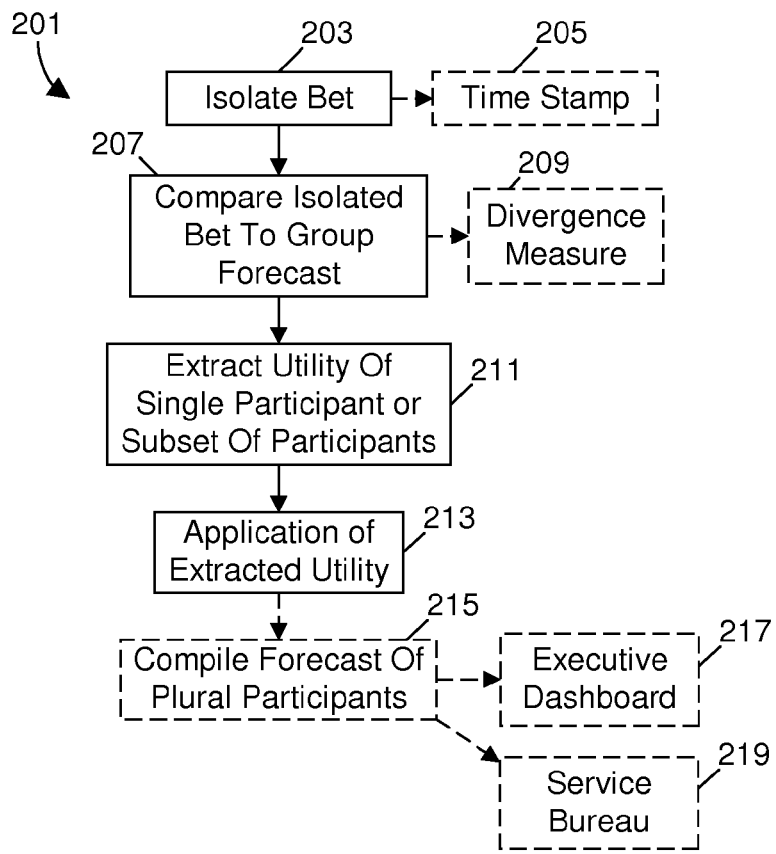
FIG. 2 shows one embodiment of a method that extracts participant subset utility. As was the case above, dashed-line blocks represent optional features.

FIG. 2 provides a method block diagram 201 for the principles introduced above. In particular, a new or marginal bet is isolated, per reference numeral 203. If desired, a time stamp may optionally be added at this time, as referenced by numeral 205, and the new bet may be logged into a database for bets or wagers as will be further described below. The new bet may now be compared to a group forecast (or more generally speaking, a probability distribution representing outcome of an event), per block 207. The comparison may take the form of an optional divergence measure, as referenced by dashed-line block 209. In particular embodiments described below, these various features may be optionally implemented by: (a) converting both the new bet and the existing probability distribution, as needed, to a common probability distribution format, such as a "Student's T distribution" (essentially a normal distribution, but with a modified format representing different degrees of freedom "d"); (b) comparing crossing points where the two distributions intersect; and (c) extracting a function representing the area where the distribution for the new bet is greater than the distribution representing the group forecast (i.e., where $P_2 > P_1$). If desired, this function may be converted into a new probability distribution (e.g., another Student's T distribution) representing utility for the participant in question, and this utility may optionally be used to update a profile for the participant (referenced above in connection with the discussion of FIG. 1 and below with respect to FIG. 12); alternatively, another database (in a set of relational databases) may be maintained which links specific participant fields (e.g., "pay grade") with an aggregated utility function representing utility for each participant matching that field (e.g., each participant matching the pay grade) in combined format. Generally speaking, it may be desired to preserve the measure of extracted utility for each participant, as this makes it easier to generate new combinations of the extracted measures of utility at a later point in time, but this is generally a design preference. The functions of extracting utility of a single participant (or subset of one or more participants) and the application of extracted utility are generally designated by numerals 211 and 213 in FIG. 2. Several dashed-line options are also depicted in FIG. 2, designated by numerals 215, 217 and 219, to represent possible application of extracted utility. For example, new forecasts, representing new actual or hypothetical events (or general trends not based on an event) may be generated using the extracted utility. Generally speaking, as referenced by numeral 215, extracted utility may be combined in a number of different ways, as given by the following sample applications: (a) A combination of utilities for select participants may be made based on participant attribute and used to generate a relative forecast for a different event based on previously collected prediction market data; (b) A combination of utilities may be used to generalize views of a subset of individuals, for example, as expressed by the statement "sales managers are overly optimistic about the company's ability to release new products on schedule, by a mean of two calendar months." Notably, the selected application does not have to involve a specific event or forecast, as revealed by these examples. Clearly, these examples are not limiting, and a combination of extracted utilities for different participants may also be used to filter specific participants from future forecasts, e.g., if it is determined that the subset of "sales managers" are always correct, or conversely always wrong, future prediction markets may be refined to be weighted on, or solely based on, or to exclude these individuals, or to transparently generate modified predictions based on statistical, historical error in the predictions of the specific subset; the point here is that one significant application of the extracted utility is that it provides relative information about the views of any particular subset relative to the views of the group of all participants as a whole. To provide yet another example, if "sales managers" are statistically about "2 months" overoptimistic about product release, future predictions may be run without polling or establishing a prediction market for the subset or even for the group at-large. Clearly, many possible applications of the principles set forth above exist. It should be noted that possible applications exist for the use of individual utility, that is, extracted from only one participant, and for this reason, the aggregation of multiple utilities together is depicted in FIG. 2 as an optional step.

FIG. 2 also shows an optional executive dashboard 217; that is, as will be further discussed below, reporting and viewing of the prediction market results, as well as of utility and utility applications, may be restricted to a select group of individuals (e.g., "managers", or based on specific permissions). In a network or software embodiment, a specific module may be invoked to allow those with specific permissions to use the principles expressed above to view utility of a participant subset and/or run applications based on participant utility. For example, using the same hypothetical just expressed, it may be desired to only allow executives to see how the views of "sales managers" diverge from the whole.

Naturally, many examples exist, and nearly any event or opinion or other view (singly or collectively, "event") may be modeled, with relative views of any desired subset of participants extracted and applied.

Finally, as also indicated by numeral 219 in FIG. 2, any or all of the features presented above may be optionally implemented on a service bureau basis, that is, for a company to run prediction market services on a for fee basis and/or providing utility applications on a for-fee basis, for example, across a wide area network, such as a the Internet.

As should be apparent from the above discussion, the principles introduced above can be optionally implemented using software to maintain "bets" or "wagers" of individual participants in a specific database within a relational database, devices, systems and methods that related to the establishment of prediction markets, that is, that model occurrence of one or more prospective events based on an aggregation of participant predictions for the events. The relational database, systems and methods provided by this disclosure are, generally speaking, automated systems that collect participant predictions, compile those predictions together to automatically form a probability distribution for the event, and that then forecast the event based upon the assembled probability model, but some, or all of these functions can also be implemented by individual software modules. By "probability distribution," it is meant that data is compiled to represent different forecasted outcomes with some mechanism for weighting some possible outcomes as more likely than others—that is, for embodiments discussed below, as multiple participants provide their inputs, overlap in their predictions is translated as indicating a greater probability of outcome in the area of overlap than outside. The specific database, systems and methods provided by this disclosure address the problems mentioned earlier, including obtaining predictions that support different possible event outcomes and allowing participants to express varying levels of confidence around a participant-selected prediction point. For example, by allowing participants to make a prediction that by its nature reflects the participant's forecast, the methods and systems provided by this disclosure enhance information aggregation and provide a natural way to communicate participant forecasts. Thus, for example, a participant seeking to make a prediction on a specific event can express a complex set of beliefs, including (in some embodiments) a range of possible outcomes. Through the use of at least one range, or more complex mechanisms of inputting a participant range, cumulative probability distributions may be built to model event forecasts in a manner generally not possible where all data represents a fixed betting point (e.g., a poll of participants as to whether yearly sales will be "greater than $1 million dollars"). By permitting a participant to specify the participant's beliefs and quoting a return (or price) around the participant's selection, the teachings provided below provide a mechanism for a participant to weigh their confidence and amount of risk relative to the beliefs of others.

To deal with more complex prediction markets, including multi-tier or multi-dimensional markets, some implementations discussed below, as well as the co-pending application incorporated by reference, above, provide examples of how to "roll-up" or "roll down" predictions, that is, to cascade new information to dependent or contributing events, so that as one probability distribution is changed, (1) forecasts for other predicted events which are dependent upon the changing probability distribution can automatically be updated and/or (2) forecasts for other predicted events upon which the changed probability distribution is based can also be skewed to maintain consistency with changed expectations for the higher level event. Some, none, or all of these processes may be used for prediction markets based on this disclosure, depending on design of the particular prediction market.

Finally, while there are many applications of prediction markets (including gambling, corporate forecasting, opinion polls, marketing purposes, or just games for diverse fun, e.g., on sports fan blog sites), it should be understood that there are a variety of ways to implement prediction markets, including within a corporate enterprise or other private network, on the open Internet, on a service bureau basis (e.g., to a group of select participants on the Internet), to a group of individuals, via distributed software, or otherwise. Several such ways of making prediction services available will be discussed by this disclosure, along with a variety of mechanisms for implementing different options. For example, in a corporate setting, it is possible to have an enterprise directory (e.g., a LDAP directory) provide information on employee status, job title, and so forth, to provide a repository for participant data (as well as implied security clearance)—in such an environment, a third party consultant, for example, can host the software on a "service bureau" basis, designing prediction markets to suit the needs of the customer (the corporate client) and to interact with employees or contractors of the corporation (at home, work or otherwise) for purposes of collecting information used for making predictions. Other mechanisms might make sense when dealing with a private group of diverse individuals not having a common corporate affiliation, e.g., it might be desired to a public key infrastructure ("PKI") protocol to provide security and gate participant access for such an environment. In yet another setting, it might be desired to have everything reside in one private network (e.g., a corporate network). Various types of design considerations will be discussed below, together with possible network architectures and software design considerations. As indicated earlier, one implementation of the principles of this disclosure is as software hosted over the Internet, and offered to clients on a "service bureau" basis. In this regard, a company may host software functionality to manage prediction markets for others, along the lines indicated by these examples. A company may also provide consulting services to aid clients in the design of automated prediction markets that will provide robust forecasting services designed to meet the client's needs.

II. An Exemplary System Implementing a Prediction Market.

Figure 3A:
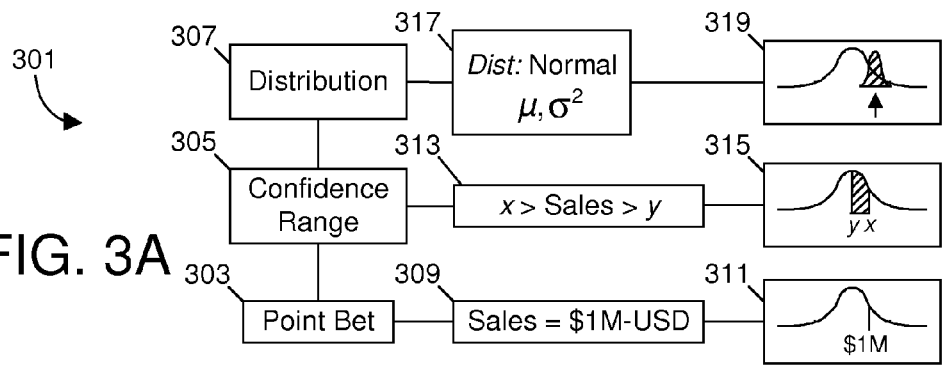
FIG. 3A is another diagram used to further explain hierarchy in a multi-dimensional prediction market, this time applied to corporate financial forecasting. In particular, a prediction market hierarchy 301 is seen to include multiple types of products ("games" and "systems") which themselves can each consist of multiple different products within these types (as represented by numerals 305, 307, 309 and 311, respectively).

FIG. 3A provides an example of different forecasts that may be expressed via user inputs in the various embodiments discussed in this disclosure, and it also provides examples of graphical, interactive displays that may be provided to enable users to make meaningful wagers that reflect their beliefs. Generally referenced by numeral 301, three different forecast models are represented. A first forecast model is a point bet, represented by box 303; as indicated earlier, a fixed model is difficult to use to generate probability distributions, because it is difficult to capture user beliefs away from the predefined point represented by the point bet, or to understand elasticity of beliefs as information (or other events) change. However, by permitting a user to select the user's betting point, far more robust data can be collected. A second forecast model (used in most of the specific examples represented below) is a confidence range, represented by box 305. Generally speaking, such a range will represent a user belief that event outcome will lie between two values (e.g., in some embodiments presented herein, the user can typically select each of a user-chosen high value and a user-chosen low value). For example, a user seeking to bet on a sporting event featuring Team 1 might predict that Team 1 will defeat Team 2 by 2-3 touchdowns (or 7-14 points), for example. A range may also be represented as a Boolean function, e.g., a prediction that a team will not meet a spread of 10 points is equivalent to a range extending from plus ten points through negative numbers, i.e., a loss. Finally, a third forecast model is represented by a more complex distribution—a user can express a distribution (for example, a Normal distribution) in the form of a mean and sigma-based value (i.e., a distance from mean, variance, or other distance measure); taking the professional football example introduced earlier, a user might wager that Team 1 will defeat Team 2 by an expected 10 points, but with a high measure of confidence that the final disparity in score will be 9-11 points, for example. Each of these forecasts are also represented by corresponding boxes 309, 313 and 317, which respectively provide examples of what a user input for each of a point bet, confidence range, or distribution, might look like.

The right-hand side of FIG. 3A also illustrates examples of corresponding graphical displays, 311, 315 and 319. One aspect of the present technology that provides for more robust user choice of forecast is an interactive, graphical display that provides the user with a charted probability distribution (cumulative to-date) overlaid by a user selected point, range, or other function (such as a second, user selected probability distribution). For example, for a graphical display 311 corresponding to a point bet, a probability distribution is presented to the user overlaid by an indication of where the user-selected point falls relative to the distribution—the prediction market can provide an expected return with pricing (odds) calculated relative to the probability distribution. That is to say, FIG. 3A indicates a price point of $1M which is the user-selected bet point—the prediction tool prices this user-selection relative to the cumulative probability distribution such that, should the user pick a more mainstream forecast (e.g., consistent with the mean depicted in graphical display 311), the return is less for a correct guess than if the user picked a point deemed relatively unlikely based on the cumulative distribution. Pricing a bet in this manner is relatively straightforward, i.e., there are straightforward, known mathematical formulas the permit computation of probability that the user is right with the user's input, and return can simply be priced as the inverse of this probability, i.e., 1/p times the amount of the user's wager. To provide a second example, graphical display 315 shows a Normal distribution with a portion of the distribution curve shaded representing a range based on a user-selected high point x and a user-selected low point y. Here too, there exist straightforward formulas in statistics for computing the probability that the user is correct, i.e., the probability the user is correct is simply the ratio of the shaded area in graphical display 315 to the overall area under the distribution curve and, again, user payoff may be computed based on a straightforward pricing model (such as 1/p times the amount of the user's wager). The third graphical display 319 is seen to overlie two probability distributions, one representing the prediction market event in question, and one representing a user selected betting weight within their selected range. For example, applying the previous sports-based example once again, a user might wish to bet $500 that Team 1 will beat Team 2 by 10 points, but also wishes to hedge his or her bet to cover a broader range with less emphasis, e.g., the user may wish to bet $250 that Team 1 will beat Team 2 by 9 or 11 points, and $100 that Team 1 will beat Team 2 by 8 or 12 points. Such a betting model may be effectuated by permitting the user to select a probability distribution and associated parameters (e.g., such as mean and a sigma-based value, in the case of a Normal distribution) and the return in this event is represented by a product-based mathematical formula. Again, while a Normal distribution is used in several embodiments below, nearly any type of distribution may be implemented using the teachings provided by this disclosure.

Figure 3B:
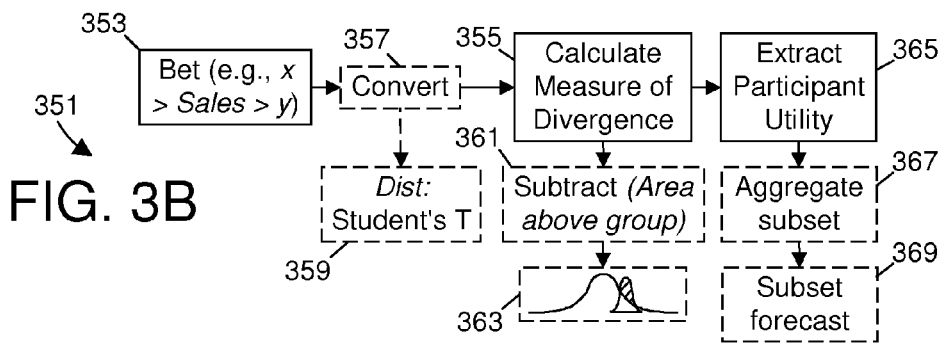
FIG. 3B provides a block diagram 351, similar to the method diagram of FIG. 2, but with additional detail relating to the extraction of participant subset utility from a probability model representing a group forecast; for example, dashed-lines representing an area where one probability curve (for the participant subset) exceeds a second probability curve (for the group as a whole) is used to signify extracted utility of the participant subset (also functionally represented by block 355). As represented by block 365, utilities extracted using one or more processes may optionally be aggregated together to show utility of nearly any desired set of individuals.

FIG. 3B provides an illustrative diagram 351 that further elaborates upon these principles. As indicated by numeral 353 at the left side of FIG. 3, a bet is made from a participant; as depicted in this figure, the bet may be a range (e.g., that "Sales" for a period will ultimately be between "x" and "y"), but the bet may be a point bet or a more complex distribution as illustrated in FIG. 3A. Whatever the format of the bet, per numeral 355, it desired to calculate a measure of divergence relative to a group view; if appropriate to the divergence function, the bet can be processed (per optional block 357) to convert the bet into a specific format, for example, into a common probability distribution type with the group view or forecast. For example, as mentioned earlier, both the bet and the distribution may be modeled as a normal, Poisson, or some other distribution type characterized by well-understood mathematical principles. In one particular embodiment, as indicated by numeral 359 and the use of a dashed-line box, each distribution may be converted to (or received or stored as) a Student's T distribution. Divergence of the new bet from the group view is then calculated, per numeral 355, for example, using the specific optional processes represented by numerals 361 and 363. Box 361 indicates that the divergence measure may be based on subtraction of one probability curve from another, for example, based on the function $$P_3 = fn\{P_2 - P_1 \text{ if } P_2(x) - P_1(x) > 0, \text{and zero otherwise}\},$$

and obviously, many similar such expressions may be used. In the formula, above, the function notation "fn" reflects the fact that the values may be mathematically converted to or modeled using a known probability distribution type, e.g., fit to yet another Student's T distribution, to provide a measure of relative utility. This function is graphically depicted using shaded curves in box 363, with calculation being potentially as simple as calculating the two crossing points between the curves, represented by the intersection of curves in block 363, with knowledge of the mean, degrees of freedom and standard deviation of the group forecast. Numerals 365, 367 and 369 as used to represent extracted participant utility based upon these principles. As represented by optional processes 367 and 369 for example, plural utilities can be aggregated together based on identifying a collection of participants having a common trait (or a specific trait), to develop a measure of relative views of any hypothetical subset of participants; such a subset for example can even be dynamically generated, using the executive dashboard introduced above, and (as indicated by numeral 369), can be used to estimate forecasts for the selected subset, even for events where participants of that subset have not been polled. As mentioned earlier, many possible applications exist for extracted utility and use of aggregated utility for a subset of participants.

With an overview thus presented, instantiation of a specific prediction market and a related system will now be discussed in greater detail.

Figure 4:
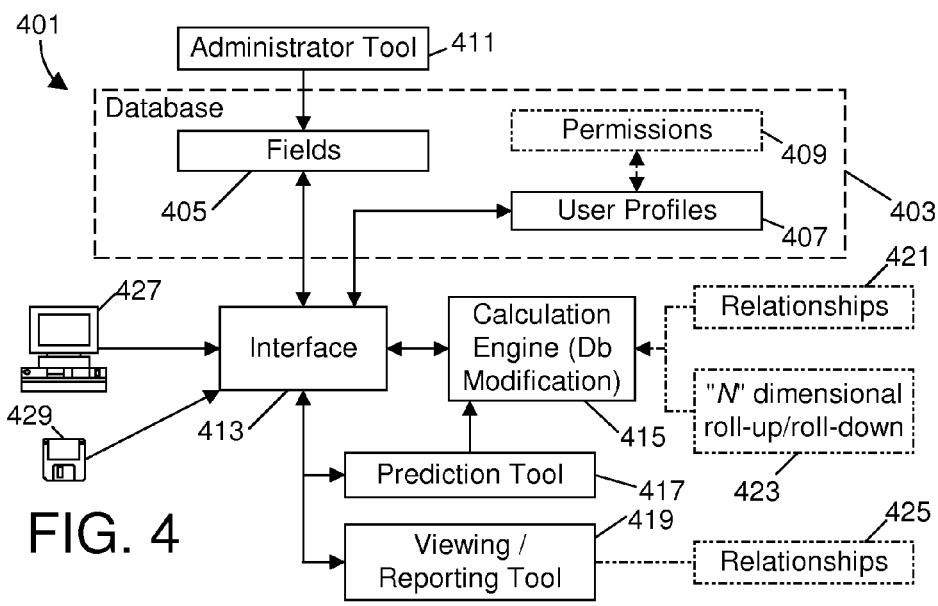
FIG. 4 is an illustrative view of one embodiment of a system 401 that can be used to manage a prediction market. The system 401 includes a relational database 403 having a number of fields 405 that define the particularities of the prediction market. An administrator tool 411 can be used to setup the prediction market and the relationships between its fields, while an interface 413 to the relational database provides most of the software functions for manipulating the fields to reflect participant predictions.

FIG. 4 generally indicates a prediction market system 401, seen as including a relational database 403, an administrator tool 411 and a processing interface 413.

The relational database 403 generally includes a number of individual databases, including a number of fields or cells 405 that are related together by mathematical or other processing dependencies. The cells that define these dependencies can be based on a spreadsheet tool, for example, Microsoft's "Excel" or "Access" programs, or more complex products such as those available from Oracle or other providers. Generally speaking, these tools will be used to create a first database that will serve as an log of participant predictions ("bet log") and a second database that will cache a cumulative probability distribution for each event being modeled, each cumulative probability distribution mathematically compiled from related participant predictions. In one particular implementation described below, the bet log is indexed by time stamp and represents all wagers entered for a particular database, even for events that have already transpired (i.e., where the outcome is already passed); the individual predictions may also be indexed by participant. Indexing wagers in these ways permits easy periodic calculation of (a) a new probability model for any specific event (i.e., by simply polling the bet log to retrieve all prior wagers for the common event or "location"), and (b) a per-participant history, which can be used to analyze participant activity and determine which participants tend to be more accurate than others. [The cumulative probability distribution for each event being modeled is stored as a "location" (i.e., in a record or field) in the second database.] A number of other individual spreadsheets or databases may also be created as part of the relational database, including a participant profile database 407 (i.e., with each record providing information for a use), a security group permissions database 409 (and delegations for adding new participants, generally indicated by phantom lines in FIG. 4) and potentially other databases. In one embodiment, each location can be structured merely as a cache for mathematical calculations based on aggregated participant predictions; for example, if each location is used to store a Normal distribution, then each cache can be indexed to a location "code" and formatted to include a weight, a mean (representing the mean of all participant predictions), and a sigma-based value. Caching values in this manner permits what is effectively advance creation of a ready display of accumulated probability distributions without the need to recompute a probability model of an event each time someone with appropriate permissions wishes to view the probability model for event outcome.

The administrator tool 411 represents a set of utilities that can be used to setup a prediction market, grant permissions to others, change market parameters, and exercise general operating system administrator control over the entire database, related files and associated software. Generally speaking, an administrator will use these tools to (a) initially define the prediction market relational database, (b) establish mathematical and other relationships between specific fields of the various databases, and (c) establish permissions for wagering (prediction), viewing, reporting, printing and other functions. As part of the initial definition, the administrator may seed each prediction market so as to establish a baseline for an initial bet. For example, it was mentioned earlier that one embodiment of this disclosure converts participant inputs to Normal distributions and then aggregates multiple Normal distributions to form a cumulative probability distribution (used to provide a "crowd-based" prediction for the event). In such an embodiment, the administrator might prior to the first wager provide an initial Normal distribution and weight the distribution to provide elasticity to support the first wager that will be received—if for example the prediction market is used to forecast "this quarter's profits", the administrator might set an initial weight of $5000 (representing $5000 in initial bets), an initial mean of $10M, and a standard deviation of $3M. The administrator should typically have an understanding of the value of a typical wager (e.g., $500 in play credits) and a somewhat accurate baseline for expected profits (e.g., last year's actual profits) for the market to offer the correct elasticity given the number and nature of wagers that will be provided, expertise that will be gained with experience.

The processing interface 413 provides most of the operations that occur with respect to the database, and serves as a vehicle to call (a) a calculation engine 415, when it is necessary to aggregate new participant inputs representing additional predictions (e.g., wagers) with previous forecasts, as well as to provide roll-up and roll-down functionality, (b) a prediction tool 417, which essentially is invoked to permit a participant to place a wager on any particular event, as permitted by the system design (the prediction tool is one type of widget functionality), and (c) a viewing and reporting tool 419, which renders meaningful charts and displays as desired for system design, and permits printing of some, all or none of the charts, again, as consonant with system design. Each location and/or participant-selected-function in the prediction market can be designed with a different level of hierarchy, requiring different types of permissions as a requirement for access. When a participant request to access, print or view a specific field or specific function is presented, the participant's account (or PKI certificate, or other security field) is checked to ascertain whether the requesting participant presents proper group membership; the security database (e.g., permissions and delegations database 409) can also be checked to determine privileges and capabilities of the group. As indicated by two phantom-line boxes 421 and 423, the calculation engine may be driven by (a) mathematical relationships associated with specific events (i.e., providing a tie between events and specific locations), and roll-up and roll-down subroutines may be called if prediction market design calls for these functions. Policies may also be employed, as indicated by box 425, to control access to viewing, printing, reporting and other functions.

Finally, as noted by graphics 427 and 429, the interface typically will reside on a machine such as a server, with the calculation engine, prediction tool, and viewing and reporting tool being driven by software, that is, by instructions stored on machine-readable storage media. As used herein, machine-readable storage media 429 can be any physical storage element used to provide information to computers, including random access memory ("RAM"), cache memory, hard disk, floppy disk, DVD, CDROM, or other format, whether physically attached to a computer, or remotely accessible by a computer (e.g., over the Internet). The machine can be any type of computer; to provide three non-limiting examples, it can be a standard personal computer (workstation or laptop), a machine within an enterprise (e.g., a server within the internal networks of a large corporation) or a machine on the Internet, such as a machine that provides hosting capabilities, shared with other business concerns or otherwise.

An administrator typically defines initial market conditions such that individual participant predictions can be made for predetermined events. For example, if one desires to setup a prediction market around a particular event, the administrator typically defines an initial distribution for the particular event and associated widget functions, to provide something that participants can view, to provide widget functionality to enter bets, and to also provide system elasticity. For some embodiments, it may be desired to permit participants to make predictions only for certain fields or locations, while permitting participants to view aggregate forecasts for a different set of events (e.g., for a corporate forecast, for example, individuals associated with a particular group may be permitted to enter predictions only for events associated with their job function, e.g., orders for each month, while other locations may be hidden from or visible to group members, with or without widget functionality, depending on group affiliation). Administrator setup is not "required," e.g., there are embodiments where the setup may be commensurate with the first prediction from a participant group and, generally speaking, setup processes may depend on desired database organization and application.

Figure 5:
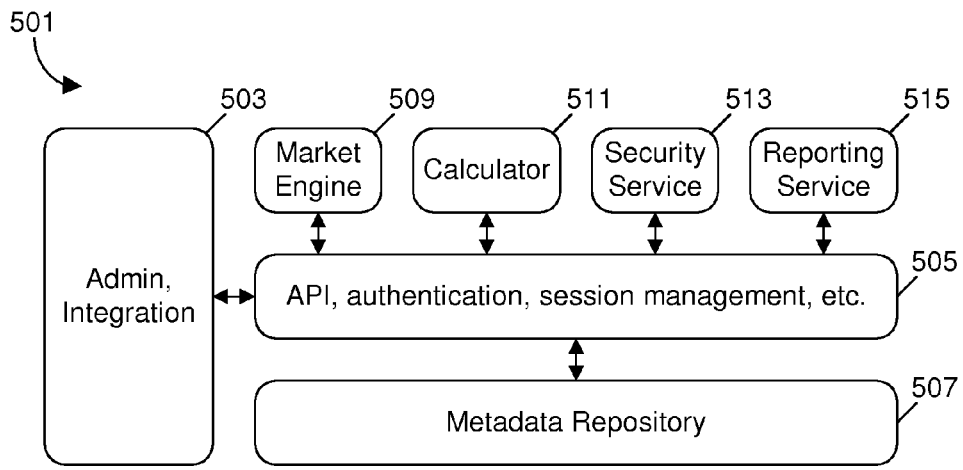
FIG. 5 is a diagram illustrating module configuration 501 of one implementation of the principles provided by this disclosure. As indicated by FIG. 5, a system implementing principles of this disclosure may be implemented as software running on one or more computer systems.

FIG. 5 illustrates module configuration 501 of one system implementation. In particular, FIG. 5 shows a number of blocks 503, 505, 507, 509, 511 and 515 where each block represents a different piece of software or a database component. As with other examples provided by this disclosure, the software components depicted in FIG. 5 should be assumed to be instructions stored on machine readable media, e.g., software, firmware, or other form of machine-executable code stored in one location or several diverse locations. Alternatively, the different pieces of software indicated by FIG. 5 can be combined into combination blocks (i.e., multi-functional modules), with the particular configuration dependent on application. FIG. 5 illustrates an example implementation as it might appear for a corporate enterprise.

A first block 503, labeled "Admin, Integration" represents a tool that can be used for initial database setup. An administrator within an enterprise for example can be one sufficiently familiar with information technology to establish a database structure so as to, for example, store an initialized database in a fashion that may be retrieved and viewed by participants of the database. The first block 503 represents software that would be used by one for this purpose, with the software configured to be as simple as a spreadsheet program or to be more intricate, for example, software that presents an administrator with a series of questions and that builds a rudimentary spreadsheet, and viewing, reporting, printing and other functions, based on the administrator's responses.

A second block 505 is labeled "API, authentication, session management, etc." and represents software that manages the database after initialization, i.e., software used for rendering images of the database, as well as for widget functionality, including commands to open up a spreadsheet associated with a location, to print and to enter prediction/wager. As indicated earlier, one implementation of the system provides a spreadsheet view where a participant may "click" on individual entries, to invoke a widget associated with the individual entry. The widget in turn invokes one or more functional commands associated with authenticating the particular participant, determining group membership (and any associated permissions) and selectively allowing the particular participant to enter a forecast or wager or print a newly displayed page. The second block 505 represents the software that performs this functionality, as well as subroutines for invoking others of the functions represented in FIG. 5.

A third block 507 is labeled "metadata repository" and represents a database of metadata used for searches associated with the database (and associated prediction market). This database may be customized depending on the particular application but, generally speaking, includes stored metadata types selected by the administrator to allow search engines to retrieve data associated with the prediction market or its various dimensions, e.g., product names, dates, specific results and so forth.

A top row of blocks 509, 511, 513 and 515 represents specific modules that may be called as needed for database operations. Block 509, also labeled "Market Engine," can be invoked to generate an interactive probability distribution and display to a participant and to permit a participant to price and place a bet using the interactive features. A calculator module (or calculation engine) 511 is invoked to update associated locations based on a newly placed bet (or other change associated with a dimension of the prediction market, including roll-up or roll-down functionality as introduced above). Block 513 represents security operations, used for querying a database (e.g., LDAP, PKI certificate list, or other listing) to determine credentials status (including any revocations list analysis), and determining group membership. Finally, block 515 (labeled "Reporting Service") is invoked to generate predefined report formats and provide associated printing functionality.

Figure 6:
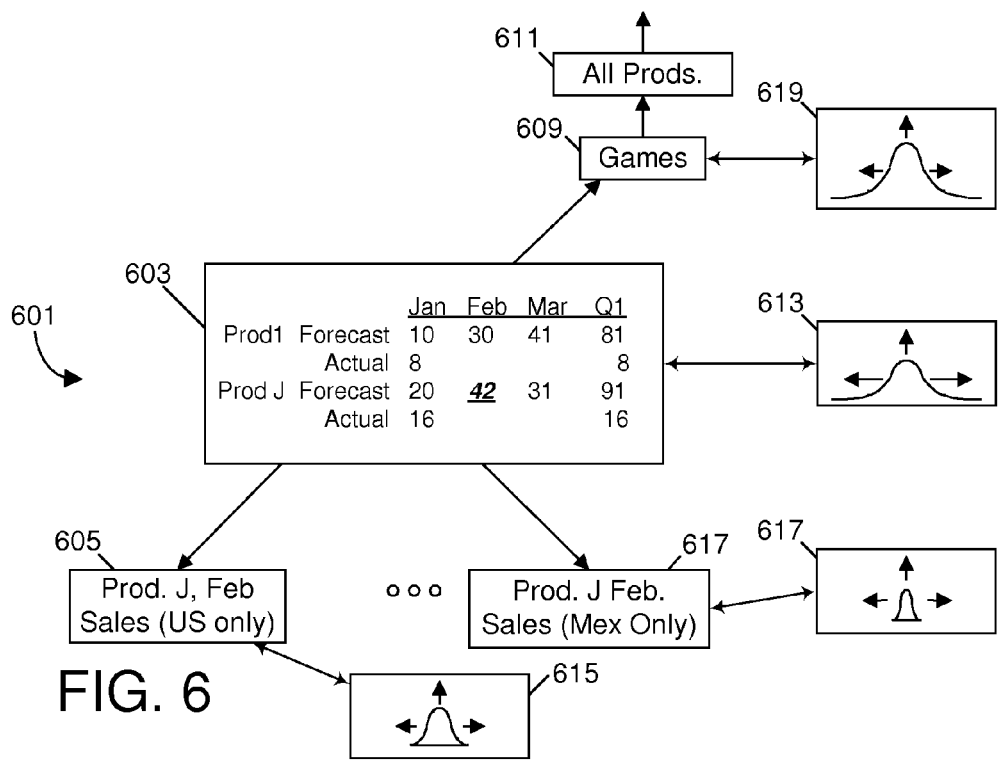
FIG. 6 provides a diagram used to introduce one example of prediction aggregation in a multi-dimensional prediction market, generally represented by numeral 601; in particular, it should be assumed that a user wishes to place a wager that will potentially adjust a probability distribution for the market as indicated by graphic 613 (or alternatively, that an administrator or manager wishes to constrain or alter a field of possible outcomes). In this case, box 603 presents a multi-dimensional prediction market representing past (January) and future (February, March) sales of hypothetical products 1 and J. The market to be adjusted is the forecast for product J in month February (as represented by an italic, underlined figure "42"). This prediction is effectively cascaded to a geography dimension (represented as plural boxes or "events," including forecast sales for just the US and for just Mexico, as indicate by boxes 605 and 607) as well as to higher order, related markets (e.g., forecasts for "all products", as indicated by box 611) using optional "roll-up" and "roll-down" functionality described below.

FIG. 6 provides an example of the effects of market roll-up and roll-down on a prediction market. In particular, FIG. 6 provides a hierarchy 601 consisting of a hypothetical product sales spreadsheet 603, a separate dimension consisting of a country breakdown (represented by boxes 605 and 607, for hypothetical sales in the US and Mexico), and two further dimensions consisting of "All Games" 609 and "All Products" 611. The product sales spreadsheet itself contains a number of entries, seen to include forecasts for Product 1 and Product J, broken down into three months (January, February and March) and a cumulative total for the quarter. [In this example, of course, it should be assumed that Product 1 and Product J are games, and that it is desired to permit any one of a group of individuals to "bet" on (and provide forecasts for) any of the numbers represented for the spreadsheet 603, for the months of February, March, or for the quarterly result— the month of January has already passed, as January shows a forecasted mean of "10" next to an event outcome of "8"]. Notably, in some implementations, it may be desired to prevent users from betting on values where the event in question has already materialized. In connection with FIG. 6, a user may wish to bet on a February sales total for "Product J" (based on the cumulative probability distribution for this month to-date). The user triggers this functionality by "clicking" on the displayed probability distribution mean (i.e., on the number "42" depicted in spreadsheet 603) which in turn invokes a widget to provide interaction with the user. Many different types of functionality may be provided by the widget, including the ability to place a bet, managerial ability to skew aggregated probability distributions or, conceivably, other functions. For example, if the user desires to place a bet, the widget may permit a user to select a betting option and then may invoke a calculation engine to potentially change the existing probability distribution for the event being bet on. If the widget is invoked by a manager in possession of new information (e.g., the manager wishes to narrow the cumulative probability distribution because the manager believes the distribution is unreasonable, the widget may permit the manager to change the mean, or otherwise modify the probability distribution. Widget functions associated with specific views, reporting options, search options and other features may also be provided.

As any particular event is changed, any change is "pushed upward" (or "rolled-up") as represented by a directional arrows linking the spreadsheet 603 with the dimension "All Games" and "All Products," and also "pushed downward" (or "rolled-down") as represented by directional arrows connecting the spreadsheet 603 and country breakdown dimensions 605 and 607. In the case of FIG. 6, it should be assumed for this hypothetical that roll-up involves the conversion to a common probability distribution model (e.g., Normal distributions) and then recalculating a new forecast at each level in succession. For example, if the February forecast for "Product J" is revised upward, the quarterly distribution based on that forecast is also recalculated, using the forecast for March and the actual data for January; the forecasts for "All Games" and "All Products" are then recalculated, using the new (revised) mean and sigma-based value obtained after incorporating the new user input. Roll-down can be effected in a number of ways, but preferably is implemented in a manner that spreads changes in a fair manner across contributing markets, with similar distributions of change in sigma-based value also pushed to the sigma-based values of contributing markets, all calculated in a manner so as to prevent arbitrage. For example, each contributing market (e.g., projected sales for Product J for February for each of the US and Mexico) will have an associated mean, sigma-based value, and weight (representing the bets to-date for the prediction market)—pushing changes downward may simply consist of spreading any change to each contributing market, with changes as to sigma-based value further scaled by the number of wagers to-date (i.e., weight) of each contributing market. These mathematical operations should be relatively straightforward to implement.

The right-hand side of FIG. 6 also shows the effects of user change to the spreadsheet 603 via graphical depictions. In particular, a first graphical depiction 613 shows a Normal or Student's T distribution with upward and sideways arrows, representing a user-change that increases the mean as well as the variance of the forecast for Product J. Rolled downward, the resultant change to US and Mexican markets (depictions 615 and 616, respectively) cascade to relatively smaller changes in distributions—spread across two markets, the amount of increase to each market may be more or less than the total increase for all countries. Rolled-upward (per graphical depiction 619), the change to but one component of a lower tier has a watered down effect, and the corresponding increase in mean and variance are smaller than for the middle depiction 613.

Figure 7:
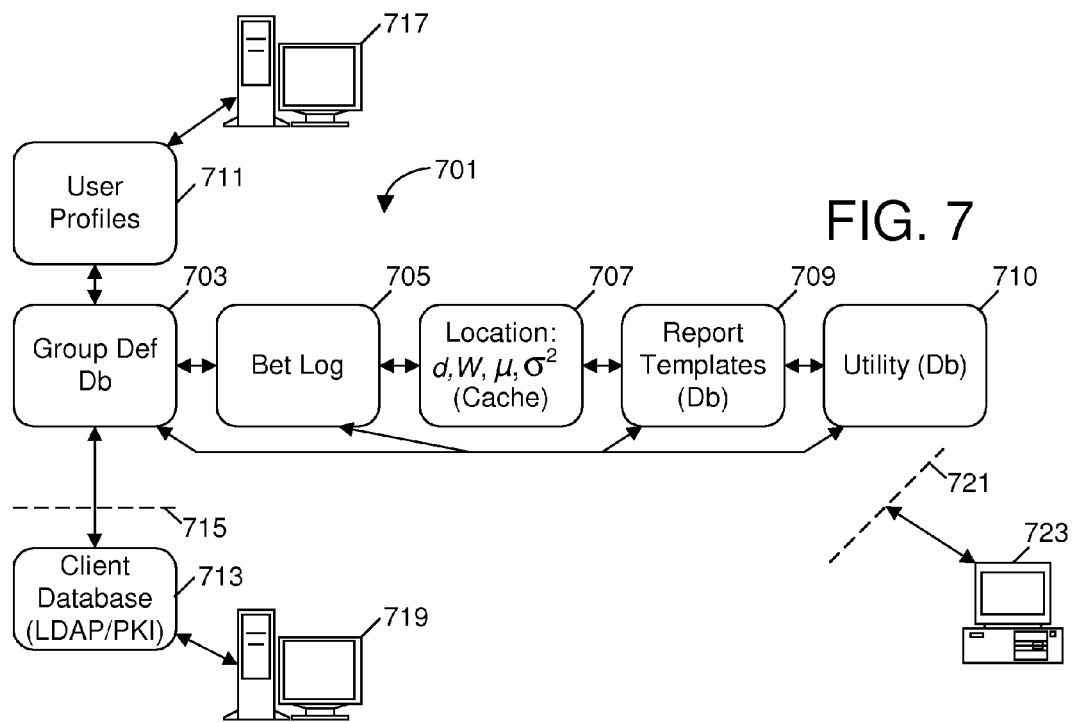
FIG. 7 provides another illustration of a system level implementation 701, with software components or modules generally designated as boxes 703, 705, 707, 709, 711 and 713. In the implementation of FIG. 7, individual software components may be hosted in different locations—for example a first phantom line 715 demarks the difference between a location used to centrally host prediction-market-specific components (above the line) from enterprise-specific-components (e.g., such as a corporate employee directory or security database); the components collectively represent a relational database. A second phantom line 723 demarks the difference in location between the hosting location (above and to the left of the line) from individual participants' computers (below and to the right of the line), as these may be at individuals participants' homes, work sites or in other locations).
Figure 9:
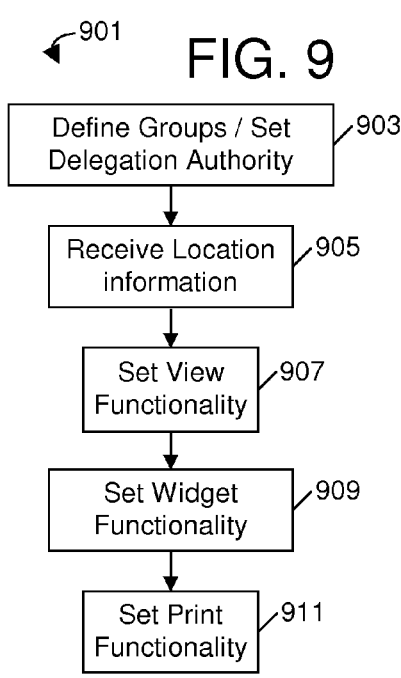
FIG. 9 provides a flowchart 901 that shows optional security-related functions that might be employed by an administrator in initializing a prediction market. For example, it may be desired in some contexts for predictions to be made available only to senior management and, in some contexts, only certain individuals may be permitted to make predictions on a specific event; in addition, different participants may be given different print or view functionality. As indicated by this FIG., an administrator may be given the "locations" defined as part of the process of FIG. 8 and responsively base access to a location, or "widget" functionality on the basis of group membership, as each collectively indicated by numerals 903, 905, 907, 909 and 911 in FIG. 9.

FIG. 7 represents another possible layout 701, illustrating organization of a relational database, viewed from a systems perspective. In particular, the database includes (a) a group definitions database 703, (b) a bet log 705, (c) a locations database 707, (d) a report templates database 709, (e) a utility database 710, (f) a database of participant profiles 711, and (g) a client security database 713. The group definitions database stores an indication of privileges by group, as well as a list of participants associated with each group (group definition). The bet log 705 represents a time-based log of each wager that has been entered by any participant for any location in the database, including for events that have since transpired (and for which betting have been subsequently closed). As each new wager is received from a participant, it is entered into the log (e.g., as returned by one of the modules from FIG. 5), and the calculation engine functions to calculate a cumulative, revised probability distribution for the event in question and to perform roll-up and roll-down functions. Each revised distribution is stored in a corresponding "location" (e.g., record) in the location database 707; the location database is used in one embodiment simply as a "cache" for the cumulative distribution function for each event modeled by the prediction market, and is indexed by a number that also appears in the bet log for each associated wager (e.g., bet ID=#xxxx).

Notably, in one embodiment, prediction market roll-up or roll-down is facilitated by converting and storing each event (i.e., the probability function stored in each location) and each wager in the bet log using a common probability distribution type, e.g., a Student's T distribution. Thus, the location database 707 is also labeled with values "d," "w," "$\mu$" and "$\sigma^2$," respectively representing "degrees of freedom," "weight," "mean" and "variance" (i.e., an example of a "sigma-based value"), representing that these values may be stored for each location (which therefore completely describes a Student's T distribution function associated with aggregated participant inputs for the particular event). In this context, nearly any "weight" measure may be chosen, but for many embodiments, the "weight" of associated participant bets is used (e.g., amount wagered), to represent the strength of participant conviction. For example, if many participants bet heavily for one event, but not for another, the weight measure is used to represent that relative preference. The mean represents the averaged midpoint for participant predictions for an event, normalized by the weight (amount) of each participant wager, and the sigma value represents divergence (e.g., standard deviation, variance, or another distance measure) of participant predictions about the mean. The location database may be used to allow for a quick, relatively calculation-free display of forecasts for any particular event, or a set of events. In an alternative embodiment, instead of "freshly" computing a probability distribution from all related participant predictions for an event from the bet log, the system may retrieve a specific location from the location database and directly combine a new participant input (prediction) with the contents of the associated location. For example, if the participant input is represented as a Student's T distribution, with values representing degrees of freedom, mean, a sigma-based value and a weight, and the location is stored using the same variables, the two probability functions may be combined in a manner described below, with a modified cumulative distribution being computed and used to overwrite previous contents of the associated location (the new participant input is also stored in the bet log as previously described). To enable this functionality, if the participant input is expressed as a point bet or a range, these values are converted into a Student's T distribution for purposes of the combination. For example, if a participant enters a range, e.g., "1000-5000," and bets $100, the mean would be "3000," the weight could be chosen as $100 (or a value dependent on this amount) and the sigma-based value could be chosen as the standard deviation, variance or another spread-based value. The two distributions would then be combined by a mathematical operation that combines the means for the two distributions (adjusted for weight) and by a mathematical operations that convolves the sigma-based values, again adjusted for weight, to arrive at a modified sigma-based value. A new, cumulative weight would also be calculated, representing the combination. Other methods of combining inputs may also be used, but as alluded to above, several embodiments provided by this disclosure perform this combination efficiently by converting multiple inputs (e.g., information representing an existing distribution and a new participant input) into a common probability distribution format (even if the new participant input does not inherently match the common format).

The report templates database 711 defines a set of predetermined report formats, indexed by group membership (e.g., groups such as "author," "delegees of author," or a predetermined group), location and possibly other relational fields, depending on implementation.

For many implementations, the enterprise or organizer running the prediction market may wish to require participant accounts, so as to permit only known individuals to make wagers. The use of a profile system also permits rewards to be given for correct predictions as well as penalties for incorrect predictions of events. For example, each participant profile can store a running account balance, and be credited with the promised return for each correct wager, and debited as each wager is made; in this manner, the system may be configured to inhibit participants with a poor track record from making new or large wagers, ensuring that participants with demonstrated prediction abilities are emphasized in future forecasts.

Finally, the client security database 713 is an authentications database used to enforce any restrictions as to viewing, printing or other functions, according to participant. For example, as indicated by the text "LDAP/PKI" in FIG. 7, in one embodiment, the client security database may include an enterprise directory which restricts access based on enterprise network affiliations, and in another embodiment, security may be enforced by possession of certain credentials (e.g., passwords, password generating tokens, possession of a specific type of digital credential such as a cryptographic certificate from a specific issuer), membership in an authentications list, or using other criteria. In at least one embodiment, a PKI infrastructure can be used to reliably authenticate participants and/or encrypt transmissions, or to gate access to an executive dashboard (or reporting tool) or to specific functions of that tool. A PKI infrastructure affords an advantage in that it provides for security around a group of diverse participants on the Internet who may have no inherent network or enterprise affiliation; for example, in an enterprise setting (e.g., where a prediction market is being driven within a large company), a PKI infrastructure may be used to extend permissions to third parties not having software or network security consistent with a particular enterprise.

FIG. 7 also helps illustrate the distributed nature of some relational database implementations of prediction markets discussed herein. For example, as represented by a first phantom (dashed) line 715, certain components of the relational database (e.g., components 703, 705, 707, 709, 710 and 711) may be stored on one network or machine (represented by a first server graphic 717) while other components (e.g., component 713) may be stored on a distinct network or machine (such as represented by a second server graphic 719). To elaborate, in one embodiment, the first server graphic 717 may represent a website hosted by a company that provides prediction services to a remote enterprise client, while the second server graphic 719 may represent a site or system of the enterprise client, e.g., behind a distinct firewall. One embodiment provided by this disclosure is indeed a hosted "service bureau" prediction market service, with services being rendered to enterprise clients that designate their own employees or other individuals as the "participants" who will enter wagers. As represented by a second phantom line 721 and a personal computer graphic 723, these participants may be located in yet another location, for example, at a remote location with access provided via the world wide web (i.e., the Internet).

FIGS. 8-13 are used to provide additional detail associated with market setup and exemplary operation for a multi-dimensional (or "multi-tiered") prediction market. As mentioned earlier, by standardizing the data format of each "location" and, if desired, each wager, the present disclosure facilitates the solicitation of participant-selected predictions and the aggregation of those predictions into a cumulative probability distribution, to develop a probability distribution based on the "wisdom" of a crowd. In one embodiment, each participant input is collected as a range and a bet (e.g., weight), and converted to the common distribution format. In a second embodiment, an interactive, graphical display is presented to the participant which permits the participant to see the shape of the to-date cumulative distribution for the particular event, matched against a participant-range selection that may be varied in a manner that displays changes in expected return for different wagers (e.g., based upon the cumulative probability distribution to-date); that is to say, the interactive, graphical display facilitates a participant's specification of one or more betting points (or a range of outcomes), because the participant can weigh risk and outcome with strength of the participant's beliefs. The presentation of data in this manner should further contribute toward automated collection and aggregation of meaningful data based upon this assessment.

Figure 8:
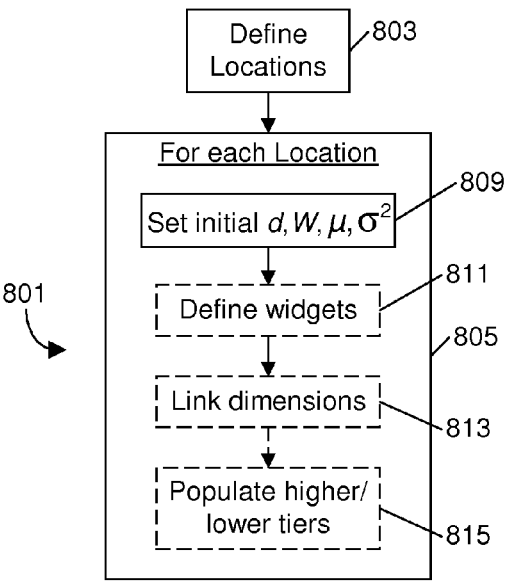
FIG. 8 provides a flowchart 801 of a method of initializing a prediction market, that is, of seeding the market to define events and the interrelationship between multiple events in a multi-dimensional context. As alluded to earlier, this method may be performed by an administrator for the market and associated databases and systems. Defining a multi-dimensional framework for many embodiments may be relatively straightforward, e.g., establishing spreadsheets and mathematical operations between spreadsheets, creating desired display nuances, and implementing interactive functionality presented to participants in order to make predictions (these interactive capabilities will be discussed below in the context of "widgets").

FIG. 8 illustrates an optional method 801 for initializing a prediction market. As indicated, it generally is desired to form a cumulative probability distribution representing crowd forecasts, and for the method depicted in FIG. 8, it will be assumed that a computer systems administrator wishes to seed (initialize) a prediction market such that when a first participant wager opportunity is presented, a probability function will already exist against which the participant can weigh risk with expected return. Accordingly, FIG. 8 represents a method of initially seeding a prediction market for this function. In the example of FIG. 8, it should be assumed that a number of events are to be modeled (such as may be used for example in a multi-dimension prediction market). Numeral 803 therefore denotes that, if desired, multiple locations may be defined (e.g., as a database) with each location being associated with a respective event that is to be modeled. Each location is then initialized with seed data, as represented by block 805, and the administrator may then proceed to define groups and permissions if appropriate to the prediction market, as represented by function 807 in FIG. 8.

For each location, per block 805, the administrator can set an initial weight, mean and sigma-based value to describe a Student's T distribution that will be used as a starting point for the prediction market. As indicated earlier, such a distribution need not be used for all embodiments, and the administrator may choose a different form of distribution, with the form of distribution and defining statistical parameters selected for ease of combination with other, like-probability-distribution forms. With the case of one embodiment discussed below, participant inputs can be solicited as a range of data and associated wager amount (representing participant conviction that the event, when it occurs, will transpire within the predicted range); to provide sufficient elasticity to initial participant wagers, the administrator typically chooses the weight value to be large relative to anticipated participant wagers, but not so large as to render the prediction market insensitive to anticipated participant wagers. For example, if the anticipated pool of participants is 50 individuals, and the anticipated average wager $100, the initial weight might be selected to be in the range of $500-$2000; were a first participant prediction based on a wager of $100, this initial distribution would then be revised to incorporate the participant provided range and reflect a new, combined weight (e.g., $600-2100). Similarly, the initial distribution parameters (d, mu and a sigma-based value for a Student's T distribution) are selected to lie somewhat close to space represented by anticipated participant wagers or event occurrence, to provide an appropriate amount of elasticity to the prediction market. These functions are represented in FIG. 8 by numeral 809. As mentioned earlier, nearly any spread measure may be used as a sigma-based value (e.g., for a Normal or Student's T distribution), including a high/low extreme or other expression of distance from mean, although if desired, traditional variance and standard deviation (commonly designated in statistics as sigma-squared and sigma, respectively) may also be used—the term "sigma-based value" is not limited to the traditional measures.

FIG. 8 also shows a phantom line box 811, labeled "widgets," to denote that widget functionality may optionally be used in some implementations—a widget may be used for any location (and any displayed metric or event) where some functionality is to be invoked by "clicking" on the displayed metric or event. As one example, in a corporate forecasting environment, a widget may be associated with individual financial figures that appear on a spreadsheet and, when clicked, be used to invoke wager functionality. The participant action (i.e., "clicking") may be used to invoke a dialog box that displays a graphic to the participant and permits the participant to interactively size up probability associated with any range selected by the participant and anticipated return. That is to say, this embodiment provides a graphical display and using a computer cursor, permits a participant to geographically select a particular part in the display, and invoke functionality dependent on the specific part of the display selected, as has been previously described. Widgets are not the only means of placing a wager, i.e., to provide a non-limiting example, individual numbers or events may be hyperlinked and used to direct a participant to a web page used for placing a wager; other possibilities also exist. An example of placing a wager using a widget will be presented below, in connection with the discussion of FIG. 8.

For a multi-dimension or multi-tiered prediction market (the terms multi-dimension and multi-tier are used interchangeably), the administrator may also link locations based upon associated mathematical or other processing dependencies, as indicated by reference numeral 813. For example, in a hypothetical corporate forecasting prediction market where it is desired to model "first quarter sales", a second "tier" of locations might be used to aggregate predictions for multiple "first tier" events together with any participant wagers for an associated second tier location. It might be desired to permit participants to make predictions on "sales for January," "sales for February," and "sales for March," and to define "first quarter sales" as a mathematical function for these month-based events. As each prediction is received, e.g., a wager on sales for March, it may be desired to "roll-up" a revised forecast for "March" such that it is also reflected in another tier (e.g., "first quarter sales"). If a new participant input expresses a prediction of significant sales for March, the new participant input is combined with existing participant wagers (represented by a cumulative probability distribution for "March") to obtain a revised, cumulative probability distribution for March; because, however, this change in crowd prediction for March would also imply a change in crowd predictions for the first quarter sales, a cumulative probability distribution is also revised for "first quarter sales" to reflect not only changes for March, but predictions for "January" and "February" as well, as established through the mathematical dependencies selected by the administrator. Function box 813 refers to this linking between events, linking that can be performed using common spreadsheet or database functionality to define mathematical operations between locations. For example, a database record associated with the second tier (i.e., a location) may be defined as being equal to a simple sum of three other locations (that is, three first tier records, one for January, one for February and one for March using the example indicated above).

Prediction market roll-up is not the only type of multi-dimensional operation that may be performed, as it may be desired to roll-down predictions as well. For example, using the example just presented, if a participant wager is to be made for "first quarter sales" and reflects significant sales relative to the existing distribution, it may be desired to adjust probability for lower tier events that contribute to the second tier event; increases in the distribution for "first quarter sales" may be spread across distributions for January, February and March, such that combinations of these distribution functions correspond to the revised probability distribution for "first quarter sales." While nearly any mechanism may be used to spread distribution changes to a lower tier, an administrator may wish to choose the roll-down functions in a manner that does not create the opportunity for arbitrage. That is to say, it may be preferred to allocate changes from a higher tier market in a manner proportional to the contribution of each mean and sigma-based value of a contributing probability distribution; more detail on this methodology will be presented below in connection with the discussion of prediction market roll-up and roll-down. For the present, it should be understood that the administrator during prediction market setup may define any spreadsheet or relational database math (e.g., "w610=w624+w625+w626" where "w" represents worksheet or database designation, and "c" represents cell contents) to provide cross-dimension functionality.

Finally, as represented by function block 815, the administrator may then populate any higher or lower tiers as appropriate, including locations not associated with (i.e., linked with) other defined locations. Nearly any methodology may be used for this population, for example, roll-up and roll-down functionality may be used to permit the administrator to vary higher or lower tier initial distributions and cascade changes to other levels, and other software functionality may be used to alert the administrator as to any errors or locations which remain undefined.

The administrator may wish define groups and associated permissions for a prediction market (including ability to authorize group membership to others). For example, as generally indicated by numeral 901 in FIG. 9, an administrator may invoke this functionality using an administrator tool or module. An administrator first defines groups, general permission parameters and delegation capabilities, as indicated by function block 903. Then, the administrator may select any locations as appropriate, per function block 905, and associate that location with one of the defined groups. For example, it may be desired to afford different individuals (1) different views, (2) different print capabilities, (3) authorization to enter wagers, (4) ability to modify an existing cumulative distribution, or (5) ability to run reports, all based on group membership. If desired, multiple, redundant locations may be defined in order to provide different functionalities to different groups for the same content. For example, if location "w610" represents aggregated crowd predictions for "first quarter sales" and if it is desired to permit one group to print only a first view of these predictions and a second group with full capabilities including multiple views, reporting and printing options, the administrator may define further locations (e.g., "w626=w610", and "w647=w610") and then associate each new location (or an existing location) with a specific group and specific set of permissions. The setting of different functionality (e.g., print, view, widget or other functionality) and group membership requirements to obtain access to that functionality are respectively represented by numerals 907, 909 and 911 in FIG. 9.

Figures 11, 12, 13:
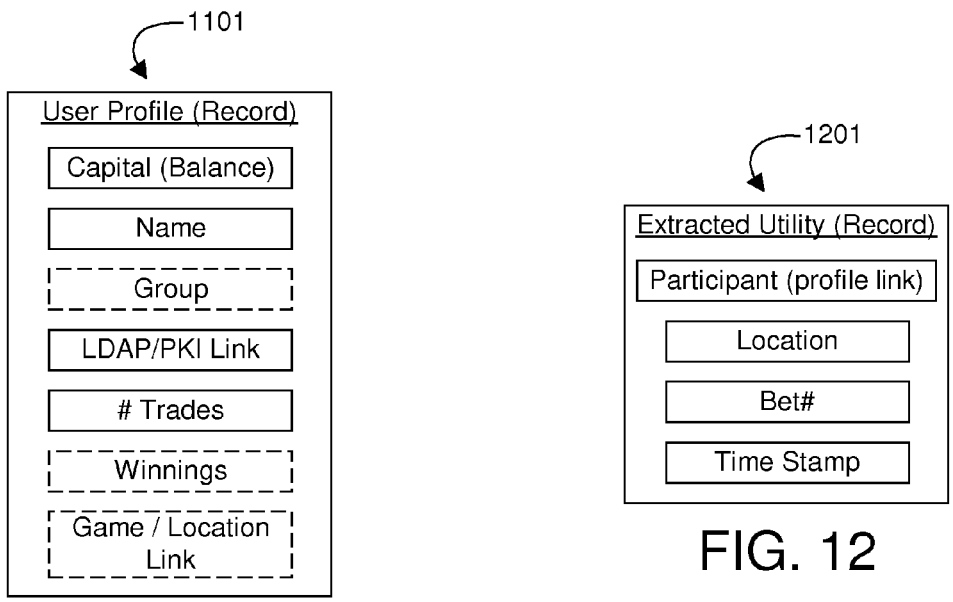
FIG. 11 is an illustrative diagram that shows possible fields for a participant profile record 1101. As indicated earlier with respect to FIGS. 4 and 7, one component of a relational database may be a participant profile or account database, used to provide information about participants, such as account information, account status, and potentially other options such as bet history.
FIG. 12 is an illustrative view that shows possible fields for a participant utility database 1201. As indicated in this FIG., such a database may contain a log of each extracted utility function and a field referencing particular prediction market (location) in which the specific utility measure was collected, and a reference to the bet log containing the specific bet made by the participant.
FIG. 13 is an illustrative view of one implementation of a bet log 1301. The bet log 1301 represents one way of tracking wagers from all participants and also for calculating views and aggregate predictions based on multiple wagers. In one embodiment, a prediction based on aggregation of wagers can be effectuated by weighting a newly-received wager with a weighted, previously computed aggregate forecast; in another embodiment, each wager associated with an event is indexed by "location" associated with the event and, with each new wager, every related wager is retrieved from the bet log and used to newly compute a probability distribution.

One aspect of setup that deserves mention relates to the optional use of participant profiles to regulate participant wagers. While there are implementations that may be designed that do not provide rewards to participants, or which do not require special permissions or security (e.g., group membership), in one embodiment, a participant account or participant profile system is used for (a) security, (b) record keeping, and (c) to provide rewards to participants. FIG. 11 provides a block diagram 1101 associated with the layout (e.g., fields) of one implementation of a participant profile, i.e., it shows how a record for one participant might be designed. As indicated earlier, a database of all participant profiles might be kept as one component of a relational database system (see, e.g., numeral 711 of FIG. 7).

Figure 10:
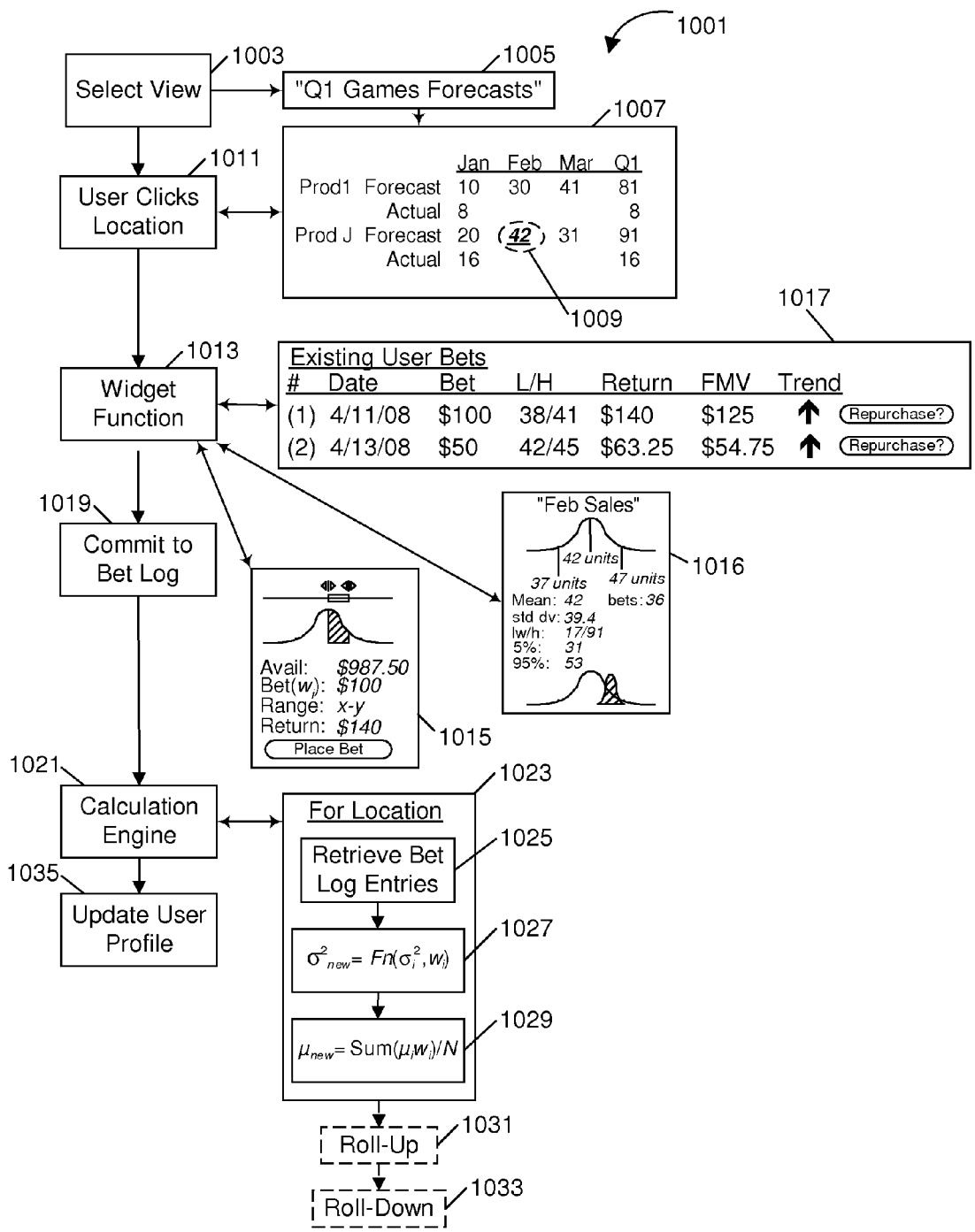
FIG. 10 is an illustrative view that shows interrelation between a method of placing a wager and associated interactive display capabilities provided by "widget" functionality, used in many of the embodiments discussed in this disclosure. Generally speaking, the left-hand side of FIG. 10 represents a method employed by a participant to place a wager, while the right-hand side represents views that could be provided to a participant and some host-level calculation functions used to integrate a wager into a prediction market that is the subject of the wager.

FIG. 10 presents a block diagram 1001 of an example prediction market; in FIG. 10, various function blocks may be conceptually divided into a left-half, representing the functions associated with a participant's placement of a wager, and a right-half, representing a number of database operations invoked by the participant. In connection with the example provided by FIG. 10, it should be assumed that the participant is participating in a prediction market run on behalf of a computer games vendor, and that the vendor is using the prediction market to obtain estimates of first quarter earnings (e.g. "Q1 games forecasts"). In this example, the company sells products "1" through "J", and the first quarter ("Q1") includes the calendar months of January, February and March.

A database may be designed such that a participant enters this hypothetical prediction market by selecting a view, for example, by opening a web-page or a spreadsheet view associated with "Q1 games forecasts." For example, the participant may select a view as represented by function block 1003 by clicking a link to open up a database (reference numeral 1005). A hypothetical web-page or spreadsheet view 1007 is responsively displayed to the participant, ideally as a graphical display that permits a participant to view individual cells or images, themselves geographically separated within a display image. Numeral 1009 and italics and underlining are used to designate one database entry for which it is desired to permit a participant to wager, e.g., "Forecast for sales for 'Product J' for the month of February;" it should be noted that each product in this example (e.g., "Product J") includes a row for each of forecasts and events that are closed (i.e., where event outcome is already known). As mentioned, if desired, locations corresponding to events that have "closed" (e.g., occurred) may be inhibited from selection. In the case illustrated, numeral 1009 identifies a number of "42" which represents the mean of the cumulative distribution (represented by participant wagers to-date for the associated, or respective, event, i.e., a probability distribution for February sales for "Product J"). A participant desiring additional detail on this estimate would place a cursor to overlie this particular cell (i.e., region or graphic within the display view 1007) and invoke widget functionality by clicking (or taking a similar action) to prompt a specific function (e.g., placing a wager) or a choice among different widget functions (e.g., place wager, view crowd forecast, list wagers, and/or other functions). The invocation of widget functionality is represented by reference numeral 1013, and three sample choices that may be offered are represented by graphics 1015, 1016, and 1017, respectively. These graphics represent, respectively, an interactive display or display graphic that may be associated with placing a wager, viewing crowd forecast for the associated event, or viewing a listing of all wagers made the participant has made in association with the particular event; as alluded, fewer functions or alternative functions may also be used.

Graphic 1015 represents a display that may be used to enter a wager. The graphic in this example includes (in order from the top of the graphic to the bottom), (a) a set of two slider bars, used to adjust high and low values of a participant-selected range, (b) a linear range indicator, which graphically superimposes a range represented by predictions to-date with a current participant-range-selection, (c) a probability distribution display (e.g., a Student's T distribution in this example), also superimposed with a participant selection of range (shaded), for purposes of permitting the participant to compare the participant's selected range with the outcome probability based on other participant's selection, (d) a listing of capital balance available for wagering (if participant accounts are employed), (e) a current bet, (f) an alphanumeric indication of the participant-selected-range (e.g., "x-y") (f) an expected return based on the entered participant wager, and (g) a pictograph, representing a an object that may be selected by the participant to commit the participant to the indicated bet. Two points should be mentioned in relation to the graphic 1015. First, for a Student's T distribution, the probability of the participant correctly picking the outcome relative to the cumulative probability distribution is represented by the ratio of the participant selected portion of the distribution (represented by the shaded area of the Normal distribution in graphic 1015) to the total area (shaded and un-shaded) associated with the graphic; computation of probability is relatively straightforward using known mathematical formulas, and pricing of expected return may be made proportional to the inverse of this ratio, accounting for (if desired) mark up or house-take, or the fact that outcome may lie outside of the range represented by all participant predictions. Second, there exist a number of options for providing a graphical display to illustrate cumulative probability relative to current-participant-wager, including options that price return (for a correct wager) (i) based only on the existing cumulative probability distribution, or (ii) based on a revised cumulative probability distribution that assumes the current-participant-wager has already been made (even though not yet logged into the database). If the prediction market is to be designed to minimize arbitrage, it may be desired to employ the latter option.

Graphic 1016 includes a simplified display of cumulative probability as stored in a "location" of the relational database. That is to say, with the processing functions described herein, a cumulative probability distribution may have already been formed based on crowd estimates and stored as a display image, by storing parameters necessary to produce a graphical display showing probability of expected outcomes; by accessing these parameters at a widget operand, software may display the cumulative probability distribution based on a small number of parameters, for example, a mean and sigma-based value in the case of a Student's T cumulative distribution. Employed in corporate forecasting for example, graphic 1016 may be used to visually a crowd-prediction, e.g., by observing aggregation of participant forecasts, weighted by amount of each participant's wager if desired, and a spread that displays the crowd's belief as to variance of event outcome. Specific metrics may also be presented, for example, as indicated, high and low values associated with the pool of predictions, 5% and 95% confidence intervals, standard deviation, and so forth. As indicated by a comparative display at the bottom of graphic 1016, the probability distribution may be accompanied by specific numbers as well as comparisons with other data (e.g., last year's actual numbers, management forecast, forecast by a different pool of participants, and so forth, collectively represented by the shaded curve).

Graphic 1017 may be used to display a list of a participant's wagers for a particular event. Importantly, in at least one embodiment, participants are permitted to repurchase bets (e.g., based on changed circumstances or new information available to the participant). It is believed that providing functionality to accomplish this end permits the incorporation of new information into the illustrated prediction markets, thereby providing for a more accurate crowd forecast. In connection with the illustrated graphic, a participant may be presented with a listing (e.g., (1), (2), etc) of previous wagers and an ability to repurchase those wagers for profit or loss (occasioned for example due to wagers from other participants). For example, if changed information implies that "February sales" will be far lower than anticipated, allowing participants to repurchase earlier wagers provides an ability to incorporate such new information into the prediction market. As depicted in connection with graphic 1017, each wager may be listed by date, bet committed by the participant, high and low range, contracted return (if the earlier bet proves correct) fair market value of the identified bet (e.g., current value of the wager, or how much the participant would credited through repurchase, less an optional repurchase penalty), current trend (i.e., recent changes in mean for the event), and a pictograph that allows a participant to select repurchase based on fair market value. In many implementations, a software designer (or the administrator) may choose to log a repurchase as a negative contract that offsets the original wager, but with a new timestamp, so as to preserve records of betting traffic and times that may be correlated with external events, if desired. Also, it should be noted that whether or not characterized as a repurchase, the described functionality also permits a participant (a) to make multiple wagers, and (b) to make negative wagers (e.g., that outcome will "not" be within a selected range); the latter may also be represented in a bet log as a negative wager for a participant-selected range.

For each placed bet or wager, for example, entered as a new wager or repurchased wager via graphics 1015 or 1017, when the participant selects a pictograph as represented by these graphics, the participant wager (or negative wager used for repurchase) is committed to the bet log, as reflected by numeral 1019. It will be recalled that in connection with an exemplary database design represented by FIG. 7, a bet log 705 may be used to store a pool of all participant wagers for all events, ordered by time stamp or other identifier.

As each bet is committed (or alternatively, as each bet is priced, per the discussion above), a calculation engine function 1021 is invoked in order to integrate the new participant input into a cumulative probability distribution to-date for the associated event. That is to say, the calculation engine is invoked by software and, as discussed above, may (i) convert as appropriate the new participant input and/or cumulative probability distribution to a common format (e.g., Normal distributions), (ii) combine the new participant input with a cumulative probability distribution (e.g., by combining weighted means and weighted sigma-based values for each distribution), and (iii) overwrite a database record (e.g., a record associated with a specific tier or dimension of the prediction market) with a revised, cumulative probability distribution that reflects the combination. If the new participant input is the first wager for an event, it may be directly stored as the initial cumulative probability distribution, or mixed with initialization values established by an administrator as discussed earlier.

Importantly, many of the embodiments discussed above have mentioned the use of a common probability distribution function, e.g., a Poisson, Normal, or other standard type of distribution, and conversion of each participant input to a common format. Several of the embodiments mentioned above use a Student's T or Normal distribution as this format, principally because these distributions represent a distribution with well-understood associated mathematics. The use of such distributions and common conversion to these formats may be preferred for some implementations to enable use of well-understood mathematics, but is not required to implement many of the teachings presented by this disclosure.

In a multi-dimensional prediction market per the examples presented above, in a situation where all participant wagers are stored in a common "bet log," two methods may be used to combine the predicted outcome represented by the new participant input with the cumulative distribution function for an associated event: (1) the cumulative distribution function may be retrieved with associated weights from a "location" (i.e., cell that stores cached cumulative distribution for display), and blended with the new participant input; or (2) every other participant wager to-date for the same event may be retrieved from the bet log and blended with the new input "en masse." FIG. 10 presents an example of the latter, i.e., as reflected by box 1023, for each location affected by the new participant input, the calculation engine (a) retrieves every bet log entry for the same event (e.g., a record of each wager in the bet log stores a location ID or, equivalently, some link to a common event), per numeral 1025, (b) blends together individual sigma-based values (e.g., variance as indicated by numeral 1027) to obtain a new sigma-based value as a function of individual sigma-based values for each associated participant wager and associated weight, and (c) blends together individual means as a function of weights and means associated with each participant input, as indicated by reference numeral 1029. These new values (together with a new aggregate weight) are then stored in the specific cache "location" to replace prior contents, i.e., to thereby facilitate the display of a revised or updated cumulative probability distribution. As indicated by function blocks 1031 and 1033, after contents of a contents are updated (per box 1023), roll-up and roll-down functions are performed (i.e., for a multi-dimensional prediction market).

Once the calculation engine has updated the location database (see block 707 from FIG. 7), software then updates the corresponding participant profile, as referenced by numeral 1035. For example, software may update a participant profile record (exemplified in FIG. 7) and store the updated profile in a participant profile database (see, e.g., numeral 711 of FIG. 7).

From a security standpoint, view, print, report and other widget or non-widget functionality may be tied to permissions as has been previously described; as a participant selects a function (e.g., clicks a location), the widget or other software queries a security database (see, e.g., database 713 from FIG. 7) as to whether the participant has adequate permissions to perform the requested function. In this regard, each "location" may return an indicator of each associated group in a group permissions database (see, e.g., numeral 703 from FIG. 7) in addition to cached display information for a cumulative probability distribution; the widget functionality may be designed so as to request a group permission level (e.g., whether the requested functionality is available to the group) and to query whether the particular participant is part of the group. For example, in a PKI-based system, groups may simply be represented as an identification of a specific set of permissions and a list of names/certificates that belong to the group, with standard PKI protocols, e.g., revocations checking, being employed to authorize the specific participant. In an LDAP or network based system, other factors may be used, such as the participant's domain, server affiliation, pay grade, or other stored information. In some implementations, permissions may simply be inferred based on possession of a recognized, unrevoked credential, or network access. Access to specific views, specific "locations," reports or other functionality may be provided or denied in a conventional manner, e.g., by enabling or restricting access to specific worksheets, web pages, or in another conventional manner.

FIG. 11 illustrates structure of one hypothetical participant profile 1101, stored as a record of an account for a single participant. As illustrated in FIG. 11, fields that may be included in such a record include capital balance, name, group association or associations, a link to an authentication source (e.g., a link to an LDAP entry, a PKI certificate, or some other source of authentication), an identification of number of trades made, winnings to-date, and a link to each location where a wager has been placed. Some of these fields are illustrated in FIG. 11 to have phantom (i.e., dashed) lines to indicate optional use, but in reality, each depicted field is optional and usage depends on specific implementation; conversely, nearly any other desired field (e.g., address, city, an ID number, title, corporate affiliation, and so forth, may also be included in a participant profile. As with the other database initialization parameters mentioned above, an administrator typically initializes the database (e.g., defines a spreadsheet and associated fields) and uses script or other software functionality to permit new participants to create an account and populate the associated fields.

One aspect of prediction markets alluded to above relates to the use of wagers to express participant confidence around a prediction. To this effect, one embodiment of this disclosure calls for (a) specifically inviting participants to participate in a string of prediction markets, (b) creating a participant account and capital balance with a specific amount of "play money" with which to wager (these implementations may also be applied to Vegas-style gaming, if desired, i.e., wagers based on real money), (c) permitting participants to selectively place wagers within the limits of their balance, and (d) rewarding participants for correct wagers. Software managing the placement of wagers (e.g., the widget functionality mentioned above) may refuse to permit participants to place wagers outside the bounds of the participant's capital balance. By providing participants with rewards and permitting participants to "run out of cash," this particular implementation provides a system that rewards correct predictions and so funnels "strings" of prediction markets to a system where more successful participants bet more heavily, i.e., (a) where cumulatively probability distributions are "more accurate" because they are weighted in dependence upon participant wagers, and (b) where participants with poor estimates are weeded from the system based on losses. Of course, in an enterprise setting, an administrator may choose to periodically provide threshold amounts of new capital to participants who run out of cash. To this end, the "capital (balance)" field depicted in FIG. 11 typically represents a field not controllable by the participant, other than indirectly, based on wagers made, won and lost.

An account-reward-based system is by no means required for every system, e.g., a prediction market could be designed to provide other forms of reward for correct predictions—for example, in a corporate forecast setting, each participant could have a capital balance in which "1,000" points is placed every month, with a reimbursed dinner or other reward being provided to the participant with the greatest return based on predictions. Nearly any type of reward may be used to provide a motivation for participants to enter predictions, and in some implementations, it may not be necessary to provide a reward of any form.

As mentioned, each participant account may also have entries for name, group, and an authentication mechanism (e.g., LDAP, PKI certificate, password, possession of a network account, and so forth), which helps fulfill a security purpose of a participant account-based system. For example, it may be desired for some implementations to restrict wagers for certain locations to only "certain" participants, for example, "managers." By including an authentication link as part of the registration information of each participant, an administrator can anticipate prediction market designs where functionality (e.g., wager, print, view, report, modify, grant permissions to others) is restricted to individuals meeting a specific criteria (e.g., "managers," "employed by our company," "on our network," "having a PKI certificate issued by our private certificate authority," "on credentials list B," and so forth). Similarly, a name or similar field may be used if anonymity is not required, or if it is desired to run reports to assess demographics associated with participation, or with correct or incorrect wagers. Other fields, such as number of trades to-date (or within a specific time period), winnings to-date (or within a time period), avatar, nickname, email address, department, games participated in, and a listing of all wagers made may also be included; some or all of these entries may also be separated into a separate component of the relational database (e.g., all trades by participant ID). Again, nearly any set of desired fields may be used if appropriate to the particular prediction market or to a contemplated application of extracted utility. Furthermore, if desired, participant registration records and records of wagers made or widgets invoked may used for purposes of metadata collection (see numeral 505 from FIG. 5).

FIG. 12 presents one illustration of a utility database 1201. In particular, this database is seen to have a record for each measure representing extracted utility, indexed by participant, location (e.g., prediction market), time stamp, and a bet in a specific bet log. Different fields, a smaller set of fields or additional fields may be included for these records as appropriate to the application.

FIG. 13 presents an exemplary bet log 1301. In particular, the bet log is seen to include a number of participant wagers, each indexed by a wager number (e.g., "(1)-(i)") a timestamp, a participant ID ("UID"), a location identifier (representing the specific event that was the subject of the participant wager), a low range indication ("x"), a high range indication ("y"), a result for events that have occurred, the weight of the bet (e.g., wager amount), and a return (or the amount paid to the participant). In this regard, each location (e.g., "123J7") identifies a specific event being bet upon by the participant; in the example of FIG. 13, bets (1) and (3) relate to the same event ("123J7"), i.e., to the same location, so that in an embodiment that re-calculates cumulative probability distribution following each new wager directly from the bet log, software would poll the bet log to identify each wager for the same event (represented by the new participant input), would retrieve each identified wager (e.g., events (1) and (3), associated with "location" "123J7"), and would use the calculation engine to compute a new cumulative probability distribution, revised to incorporate the forecasted outcome represented by the new participant input. As mentioned earlier, some embodiments do not perform this process, e.g., they may ignore prior bet log entries and simply enter the new participant input in the bet log and combine it with existing cache (i.e., "location") contents. The illustrated bet log 1301 may also be used to provide a record of all bets or wagers per participant, i.e., by returning from the bet log all wagers corresponding to a specific participant ID or set of participant IDs.

III. Applications to Service Bureau Usage.

The teachings presented above permit a number of business models, depending upon the desired goal. For example, as mentioned earlier, forecasting software using the processes and database structures described above may implement a prediction market to solicit crowd-based predictions for nearly any desired end. In connection with corporate forecasting, a business enterprise (e.g., a large company) may employ prediction markets within internal networks of the enterprise to obtain accurate forecasting from a wide range of individuals associated with various functions within the enterprise; these individuals preferably represent a diversity of function, so that participant inputs are not correlated in a manner that reflects undesired bias. The teachings presented above may also be used to collect information about possible events, including political events or sporting events. For example, a sports information agency may use these teachings to predict the outcomes of sporting events, or sports seasons by collecting information in the form of participant wagers from a blog base (whether weighted by bet amounts, provided with rewards or otherwise), to obtain probability distributions that reflect crowd wisdom. Still further, an entity may create software to perform these functions and sell that software to end participants, such as a business enterprise or sports information agency referenced above.

A further business model based on these teachings employs a service bureau model to charge clients for crowd-based forecasting services. This service bureau model may feature a company that manages a database that implements a prediction market (e.g., part of a relational database such as presented above) or provides consulting for prediction market creation within an enterprise (such as by designing such a prediction market, or associated database). Such as service bureau business then generates forecasting results that may be provided to clients of the business, or for separate fee, to new clients as well. For example, a service bureau business may provide crowd-based forecasting services to a number of individual companies each for fee, and then may aggregate sanitized crowd forecasts (e.g., sales predictions for each of multiple companies) to provide sanitized or un-sanitized sector forecasts, for example to the individual companies themselves, or to others, such as industry analysts.

By facilitating the design prediction markets for others (e.g., enterprises or companies) to use based on the teachings presented above, or by provided crowd-based forecasts collected through the use of the processes and tools described above, the principles presented above provide for relatively accurate crowd-based models that respond quickly to new information and aggregate differing participant predictions in a robust, meaningful manner that may be used to build probability distribution models based on crowd wisdom for an events.

IV. Appendix.

An appendix attached to this specification provides additional detail regarding the implementation of systems, devices, methods and software to extract utility of a participant subset, particularly with respect to divergence measures which are expressly contemplated for some embodiments of the teachings presented above. One skilled in the art will, in view of this appendix, be provided with additional information regarding the implementation of such systems, devices, methods and software. Without limiting the foregoing, a software implementation of the methods and algorithms discussed in the following appendix, as a software program or module in a software suite, will facilitate extraction and use of utility of a participant subset, and the various applications discussed above. As mentioned earlier, Applicants may represent within the detailed description of applications which claim the benefit of this document some or all of the principles set forth in the attached appendix.

V. Conclusion.

What has been described are methods, systems and structures for predicting events based on the views of individuals (i.e., based on a "crowd"). Using data to build a probability distribution and grow the probability distribution based on new inputs from participants, these tools permit the collection of robust data from the individuals ("participants") in a manner amenable to aggregation and the revision of cumulative probability distributions. Through the optional use of roll-up and roll-down functionality, negative wagers and other features presented above, linked prediction markets may be modified to always reflect changes in information in any of the related markets. Through the extraction of utility (views reflecting motivations for a new bet or wager), systems and methods presented above permit a variety of applications based on divergence of different participant subsets from the views of groups as a whole. While a number of the embodiments presented above relate to corporate forecasting, other embodiments are also possible.

Other applications will readily occur to those having skill in the art in view of the teachings provided above, or in view of the invention defined by the claims set forth below. The foregoing discussion is intended to be illustrative only; other designs, uses, alternatives, modifications and improvements will also occur to those having skill in the art which are nonetheless within the spirit and scope of the present disclosure, which is limited and defined only by the following claims and equivalents thereto.

Appendix

1 Assumptions 1.1 Players and Preferences

The market is made up of a single market maker and a collection of traders I. Traders are indexed by i∈I. Traders seek to maximize utility over terminal wealth as described below. The market maker seeks to elicit signals from traders and subsidizes trade in an attempt to reward traders for truthfully revealing private information.

A tractable market model requires assumptions on both the distribution of variables we are trying for forecast and further structure on trader behavior. I will begin by describing the nature of uncertainty and information in the market and then explain the assumptions placed on traders.

1.2 Distributional Assumptions

The variable to be forecast is X and:

$$X|\mu,\sigma^2 \sim N(\mu,\sigma^2) \tag{1}$$

Further, the distribution of μ conditional on $\sigma^2$ is:

$$\mu | \sigma^2 \sim \mathcal{N}\left(\mu_0, \frac{\sigma^2}{n_0}\right) \tag{2}$$

Finally $\sigma^2$ is unknown and distributed according to:

$$\sigma^2 \sim IG(s_0, v_0) \tag{3}$$

Integrating out μ and $\sigma^2$ implies a prior distribution for X $$X \sim t(\mu_0, s_0, n_0, v_0) \tag{4}$$

An attractive feature of this setup is that the distribution of X is self-conjugate in a Bayesian framework as shown below. Now that I have described the distribution of the underlying random variable, I will move on to defining private signals. Trader i receives a signal $y_i$ where:

$$y_i = x + \epsilon_i \tag{5}$$

The noise term, $\epsilon_i$ is distributed as:

$$\varepsilon_i | \sigma^2 \sim \mathcal{N}\left(0, \frac{\sigma^2}{\xi_i}\right) \tag{6}$$

We assume that conditional on $\sigma^2$, noise terms are independent across traders. Furthermore, traders know their confidence level $\xi_i$. This signal structure combined with the distributional assumptions on X result in a very simple updating procedure. If trader i comes to the market maker in period 1 and reveals the pair $(y_i, \xi_i)$ (I will describe how this revelation takes place below,) then the market maker updates to a posterior distribution $X \sim t(\mu_1, s_1, n_1, v_1)$ where:

$$\mu_1 = \frac{n_0\mu_0 + \eta_i y_i}{n_0 + \eta_i} \quad (7)$$

$$s_1 = s_0 + \frac{n_0\eta_i}{n_0 + \eta_i}(y_i - \mu_0)^2 \quad (8)$$

$$n_1 = n_0 + \eta_i \quad (9)$$

$$v_1 = v_0 + 1 \quad (10)$$

where $$\eta_i = \frac{1}{1 + \frac{1}{\xi_i}}.$$

A little intuition about the updates above. The posterior location parameters $\mu_1$ is a weighted average of the prior location $\mu_0$ and the trader's signal $y_i$. The relative weight on each is determined by the trader's precision $\eta_i$ relative to the precision of the prior $n_0$.

2 Trade Inversion

"Inversion" of trade means taking trades posted by traders and backing out the information that produced trade in the first place. Trades arrive as triples $(\theta_{it}, a_{it}, b_{it})$. The market maker's goal is to recover the triple $(y_i, \xi_i, \rho_i)$. The ability to recover these variables depends critically on the assumption that traders receive information in the manner described above and update their beliefs about outcomes based on private information.

There are two basic approaches to the estimation problem presented in this section. The first is a fairly dense structural framework that makes specific assumptions about trader preferences and uses these preferences to back out beliefs from actions. The second treatment is "reduced-form". Rather than using assumptions about trader preferences to interpret behavior, I use broad assumptions about the relationship between conditional distributions, preferences and betting behavior to assign coefficients to a particular functional form.

Regardless of the treatment, the algorithms deals with this inversion in two-stages. First, they infers the parameters of a trader's conditional distribution. Next, it maps these parameters back to the signal that created them. And uses these signals to update the crowd distribution.

2.1 Structural Model

I assume that traders are expected utility maximizers who place bets in order to maximize the expected utility of terminal wealth. I further assume that traders are risk-averse. An expected utility representation obtains so long as preferences are complete and transitive and obey the Archimedian and independence axioms. In order to use first-order conditions to arrive at optimality, I also need to assume concavity and continuity.

I choose to model traders as having hyperbolic absolute risk aversion (HARA) preferences. For exposition, I have stuck to constant relative risk aversion (CRRA) utility. This means that as a trader becomes wealthier in the system, I expect him to place more money in a bet, all else equal. It is important to note that this is only one possible assumption about risk aversion and that the HARA class offers other options too. In particular, general HARA utility allows me to choose a minimum wealth level $\alpha$, near which traders exhibit high levels of risk aversion.

Let $\rho$ be the coefficient of relative risk aversion. A trader's utility over wealth W is:

$$U(W) = \frac{W^{1-\rho}}{1-\rho} \quad (11)$$

The utility function in (11) is strictly increasing in W, so that higher levels of wealth imply higher levels of utility.

Marginal utility is the change in a trader's utility for a small change in wealth. Since CRRA utility is continuous, I can express this as the first derivative of the utility function:

$$U'(W) = W^{-\rho} \quad (12)$$

Differentiating marginal utility yields:

$$U''(W) = -\rho W^{-(1+\rho)} < 0 \quad (13)$$

so the utility function is strictly concave, implying risk aversion. Concavity means that at high levels of wealth, a trader feels relatively less better off with a given gain than he does at low levels of wealth.

The inversion algorithm requires computation of utility and marginal utility in the states relevant to the trader (as defined by the bets he makes).

2.1.1 Betting Objective Function

I model traders as maximizing their expected utility of terminal wealth. To arrive at interior solutions, I choose to model them as risk-averse. Besides the usual caveats attached to expected-utility theory, there are a few points to make:

1. In the closed system of a prediction market, utility really isn't over wealth, rather it is over the prizes attached to wealth. My analysis presumes a prizing system that closely resembles real money.
2. A rigorous description of betting behavior should address the fact that wealth in the system is small relative to total wealth. A possible concern is that traders are much less risk-averse inside of the system than they are outside of the system. More importantly, there is the potential for distortion of allocations inside the system as a result of allocations outside of the system.
3. The model outlined below corresponds to a single market operating in isolation. An environment in which a trader has multiple trading opportunities requires a more complicated optimization routine that balances diversification benefits and relative informedness across bets.

Generally a trader i arriving at time t solves the problem:

$$\max_{\theta_{it}, a_{it}, b_{it}} V_{it} = E_{it}[U_i(W_{iT})] \quad (14)$$

subject to the budget constraint:

$$W_{iT} = W_{it} + \theta_{it}\left(\frac{1}{P_t(a_{it}, b_{it})} - 1\right) \quad (15)$$

Let's pause here to interpret and simplify (somewhat) these equations with an aim to producing meaningful first-order-conditions for the trader. Start by noting the subscripts on terms in the optimization problem (14).

1. The expectations operator E has subscripts i and t. This is meant to reflect that expectations are taken with respect to trader i's information set at time t.
2. The utility function takes a subscript i to allow some heterogeneity among traders. In my model, traders differ only in their risk aversion.

3. Trader i's terminal wealth has time subscript T. Inclusion of this particular term for wealth corresponds to the assumption that the trader is concerned only with wealth at time T.

For simplicity, I will suppress subscripts on V, E and U. Now move on to the budget constraint, (15):

1. $W_{it}$ is the time t endowment of trader i. This is the sum of the initial endowment of trader i, $W_{i0}$ and all trading gains and losses incurred up to time t.
2. $P_t(a_{it}, b_{it})$ is the crowd's probability mass over the closed interval $[a_{it}, b_{it}]$.
3. I is an indicator variable taking on a value of 1 if the bet is a winner and 0 if the bet is a loser.

I will suppress the arguments for P. I will also suppress all subscripts on trade variables. I will suppress the identity subscripts on W. In the case of a single bet, notice that we can partition states of the world into two groups, one in which the bet pays off (+) and those where the bet does not (−). For a given bet, I will suppress time subscripts on terminal wealth and define $W^+$ as wealth in the winning (up) state and $W^-$ as wealth in the losing (down) state.

Finally, define $G_{it}(a,b)$ as the probability mass between points a and b conditional on trader i's information set at time t. Again, I will suppress subscripts and arguments for clarity. Will all of these simplifications, problem (14) becomes:

$$\max_{\theta,a,b} V = GU(W^+) + (1-G)U(W^-) \tag{16}$$

subject to:

$$W^+ = W_t + \theta\left(\frac{1}{P} - 1\right) \tag{17}$$

$$W^- = W_t - \theta \tag{18}$$

2.1.2 General FOCs

Technical Note: The following derivation of the first-order conditions presumes a number of things. Taking derivatives requires us to assume that functions are suitably smooth over their domains. This is not a problem for continuous distributions and the general HARA class of utility functions. Also, as I take partials with respect to each of the controls I hold the remaining controls fixed. In other words, I choose an optimal θ holding a and b fixed, then choose an optimal a holding b and θ fixed, and so on. In a more tractable world, I would instead derive θ for a fixed range and then substitute this optimal θ into the first-order-conditions for the remaining controls, eventually arriving at θ, a and b that are functions of the primitives, in this case, ρ, y and ξ.

Since I know that I will be employing numerical techniques, I will derive first-order-conditions for a general expected utility representation, letting U'(W) represent the first derivative of utility. Since there are three controls, there will be three first-order-conditions. Let's start with θ. Differentiating with respect to θ yields:

$$\frac{\partial V}{\partial \theta} = \left(\frac{1}{P} - 1\right)GU'(W^+) - (1-G)U'(W^-) \tag{19}$$

Setting this equal to zero yields the first-order-condition:

$$0 = \frac{U'(W^-)}{U'(W^+)}\frac{1-G}{G} - \frac{1-P}{P} \tag{20}$$

An aside: To gain a little intuition for the first order condition described in (20), rearrange the terms to arrive at:

$$\frac{U'(W^-)}{U'(W^+)} = \frac{1-P}{P}\frac{G}{1-G}$$

The term on the left hand side is familiar as a ratio of marginal utilities and, for a given level of risk aversion, will be increasing in bet size. The right hand side can be interpreted of the informedness of an agent relative to the crowd. In other words, the more informed is an agent, the larger the bet he is willing to take, all else equal.

This process is slightly more difficult for a and b, since P and G depend on these two controls. We will solve for these conditions given a fixed θ. It is useful to apply product rule first, consolidate terms and then substitute partial derivatives.

$$\frac{\partial V}{\partial a} = \frac{\partial G}{\partial a}U(W^+) + G\frac{\partial U(W^+)}{\partial a} + \frac{\partial(1-G)}{\partial a}U(W^-) + \tag{21}$$

$$(1-G)\frac{\partial U(W^-)}{\partial a}$$

$$= \frac{\partial G}{\partial a}[U(W^+) - U(W^-)] + G\frac{\partial U(W^+)}{\partial a} + \tag{22}$$

$$(1-G)\frac{\partial U(W^-)}{\partial a}$$

There are three partials to compute. First, note that using the chain rule:

$$\frac{\partial U(W^-)}{\partial a} = U'(W^-)\frac{\partial W^-}{\partial a} \tag{23}$$

Further:

$$\frac{\partial}{\partial a}W^- = \frac{\partial}{\partial a}(W_t - \theta) = 0 \tag{24}$$

This is intuitive. In any state in which a trader loses on a bet, the size of the bet range does not matter. Next, recall that P is a function of a so that:

$$\frac{\partial U(W^+)}{\partial a} = -U'(W^+)\theta\frac{\partial P}{\partial a}\frac{1}{P^2} \tag{25}$$

This results from the fact that the magnitude of a bet's payoff is inversely related to the crowd's cumulative probability of the bet paying off. Finally, note that if P(•) and G(•) represent cumulative distribution functions, then P=P(b)−P(a), G=G(b)−G(a), and:

$$\frac{\partial P}{\partial a} = -p(a) \tag{26}$$

$$\frac{\partial G}{\partial a} = -g(a) \tag{27}$$

where p(•) and g(•) indicate crowd and conditional pdfs, respectively. Therefore the partial derivative of expected utility with respect to a is:

$$\frac{\partial V}{\partial a} = -g(a)[U(W^+) - U(W^-)] + GU'(W^+)\theta \frac{p(a)}{P^2} \quad (28)$$

So that the first-order-condition for a is:

$$0 = g(a)[U(W^+) - U(W^-)] - GU'(W^+)\theta \frac{p(a)}{P^2} \quad (29)$$

Now, recognize that the first-order-condition for b differs little from that of a. In fact, the only relevant changes are in the partials:

$$\frac{\partial P}{\partial b} - p(b) \quad (30)$$

$$\frac{\partial G}{\partial b} - g(b) \quad (31)$$

so the last first-order-condition is:

$$0 = g(b)[U(W^+) - U(W^-)] - GU'(W^+)\theta \frac{p(b)}{P^2} \quad (32)$$

An aside: To gain a little intuition for the first order conditions for a (and, by symmetry b) rearrange the terms in 29 to arrive at:

$$\frac{g(a)}{G}[U(W^+) - U(W^-)] = \frac{p(a)}{P}\frac{\theta}{P}U'(W^+)$$

This equation equates the marginal benefits (higher probability of payoff) of lowering the lower bound on the left side with the marginal costs (higher bet price) of lowering the lower bound on the right hand side.

In summary, I have three first-order-conditions:

$$0 = \left(\frac{1}{P} - 1\right)GU'(W^+) - (1 - G)U'(W^-) \quad (33)$$

$$0 = g(a)[U(W^+) - U(W^-)] - GU'(W^+)\theta \frac{p(a)}{P^2} \quad (34)$$

$$0 = g(b)[u(W^+) - U(W^-)] - GU'(W^+)\theta \frac{p(b)}{P^2} \quad (35)$$

Solving the optimization problem of the trader means finding the triple (θ, a, b) that satisfies these conditions.

2.1.3 Structural Estimation

So long as these assumptions hold, we can run the trader's optimization in reverse and infer the parameters of his conditional beliefs $\phi_i=(\mu_i, s_i, n_i, v_i)$ that caused him to place a trade in the first place. Normally, I would choose distributional assumptions and an information structure that would accommodate a closed-form solution to the trader's objective function, for which inversion would be straightforward. Lacking this, we are forced to use numerical methods.

I choose to think about the solution to the trader's first-order conditions as equivalent to a nonlinear least-squares problem. In other words, the market maker's problem is:

$$\min_{\phi_i} F(\phi_i | \theta_{it}, a_{it}, b_{it}, \phi_t) \quad (36)$$

$$F(\phi_i | \theta_{it}, a_{it}, b_{it}, \phi_t) = \sum_{j=1}^{3} f_j(\phi_i | \theta_{it}, a_{it}, b_{it}, \phi_t)^2 \quad (37)$$

and where (suppressing arguments and parameters)

$$f_1 = \left(\frac{1}{P} - 1\right)GU'(W^+) - (1 - G)U'(W^-) \quad (38)$$

$$f_2 = g(a)[U(W^+) - U(W^-)] - GU'(W^+)\theta \frac{p(a)}{P^2} \quad (39)$$

$$f_3 = g(b)[U(W^+) - U(W^-)] - GU'(W^+)\theta \frac{p(b)}{P^2} \quad (40)$$

Notice that (38)-(40) are nearly identical to (33)-(35). In English, the market maker's problem in (36) is to choose parameters that minimize the sum of squared errors in the trader's first-order conditions. As a thought experiment, if the market maker is able to correctly choose parameters, then the trader's first-order conditions are met and the components $f_j$ are all identically equal to zero.

Estimation is an optimization problem and I can write down the gradient of the market maker's objective function, taking partial derivatives with respect to each of the elements of $\phi_i$:

$$\frac{\partial F}{\partial \mu} = 2f_1 \frac{\partial f_1}{\partial \mu} + 2f_2 \frac{\partial f_2}{\partial \mu} + 2f_3 \frac{\partial f_3}{\partial \mu} \quad (41)$$

$$\frac{\partial F}{\partial \eta} = 2f_1 \frac{\partial f_1}{\partial \eta} + 2f_2 \frac{\partial f_2}{\partial \eta} + 2f_3 \frac{\partial f_3}{\partial \eta} \quad (42)$$

$$\frac{\partial F}{\partial \rho} = 2f_1 \frac{\partial f_1}{\partial \rho} + 2f_2 \frac{\partial f_2}{\partial \rho} + 2f_3 \frac{\partial f_3}{\partial \rho} \quad (43)$$

Prior probabilities P and p are constants with respect to μ, η and ρ. Utilities and marginal utilities are constants with respect to μ and η. All probability terms are constants with respect to ρ. This simplifies analysis somewhat since many terms are zero.

2.2 Reduced-Form Estimation

Because structural estimation of parameters is computationally-expensive, I present an alternative structural means of estimating conditional parameters from trade. In this scheme I directly estimate trader i's signal and confidence using:

$$y_i = \omega \frac{a_{it} + b_{it}}{2} + (1 - \omega)\mu_0 \quad (44)$$

$$\xi_i = \sigma_0 \theta_{it}^{1-\beta}(b_{it} - a_{it})^{-\beta} \quad (45)$$

The coefficient ω represents the weight the market maker places on the interval midpoint submitted by the trader. I interpret this as traders' degree of price sensitivity. Values of ω greater than one, imply some sensitivity to price on the part of the trader. The coefficient β governs how information about range width and bet amount are incorporated into estimation of $\xi_i$. In particular, the latter implies some degree of substitutability between bet amount and range width as ways of expressing signal confidence.

3 Aggregating Group Beliefs

The assumptions on information discussed in section 1, provide a convenient way of aggregating beliefs by group, providing I can infer individual beliefs as in section 2. To accomplish this, start with the common prior parameters ($\mu_0$, $s_0$, $n_0$, $v_0$) and recursively update with the updating algorithm contained in section 1.2, using only those signals from group members.

This scheme has the nice property that, assuming beliefs are conditionally independent across groups, factoring out the common prior allows for aggregation of beliefs by group into the full crowd.

4 Sequestering Location

This section of the document covers how to construct a pricing mechanism that sequesters information about the location of modal beliefs from traders. This is only a modification to computation of odds. Traders place interval bets, as usual. Bets are priced based on the "average" probabilities associated with the market maker's beliefs. Formally, for a $1 bet of width d, the market makes offers an "inverted ask" price, or a promised payment in the event of success of:

$$\kappa_b(d, s) = \frac{1}{\psi(d, s)} \quad (46)$$

where $\psi(d, s)$ represents the average probability of falling inside of an interval of length d on the real line in state $s \in S$:

$$\psi(d, s) = \int_{-\infty}^{\infty} f_{X|s}(x|s) \left[ \int_{x-\frac{d}{2}}^{x+\frac{d}{2}} f_{X|s}(x|s) dx \right] dx \quad (47)$$

The ask price is based solely the dispersion in market maker beliefs. The more uncertain is the market maker of the outcome variable, the cheaper will be a bet of size a. This effectively blinds the trader to the location of the outcome distribution, revealing only the tightness of the distribution. A result is that the more informative are prior trades, the worse the price a late trader gets.

4.1 Estimation of Average Probabilities

Evaluation of the double integral in (48) is computationally costly and likely to slow down pricing in practice. So we implement a Riemann approach to estimating the average probability. In particular, we select the interval $$\left[ \mu - \left(\frac{s}{v-2}\right)^{1/2}, \mu + \left(\frac{s}{v-2}\right)^{1/2} \right]$$

and partition it into M subintervals, defined by the sequence of points $\{r_0, \ldots, r_M\}$. We estimate the average probability as:

$$\hat{\psi}(d, s) = \frac{1}{M} \sum_{m=0}^{M-1} f_{X|s}\left(\frac{r_m + r_{m+1}}{2} \middle| s\right) \int_{\frac{r_m+r_{m+1}}{2} - \frac{d}{2}}^{\frac{r_m+r_{m+1}}{2} + \frac{d}{2}} f_{X|s}(x|s) dx \quad (48)$$

4.2 Ex-Interim Pricing

Because traders are allowed to revise their bets, I must also specify a contract value. Unlike the ask price, the contract value will price a bet as if it were placed under the transparent mechanism and will reflect the true probability (based on location and width) of a particular bet paying off. For a $1 bet centered at c, of width d, the contract value is:

$$\kappa(c, d, s, s) = \frac{1}{\int_{c-\frac{d}{2}}^{c+\frac{d}{2}} f_{X|s}(x|s) dx} \quad (49)$$

(The fourth s argument reflects that the bet is being valued in the same state s in which it was placed.)

In a transparent mechanism, ex-interim prices are defined by the expected value of the contract value in the current state of the market $s' \in S$. Using the notation above, the state s' price of a $1 bet made in state s in the transparent mechanism:

$$\kappa(c, d, s, s') = \kappa(c, d, s, s) \int_{c-\frac{d}{2}}^{c+\frac{d}{2}} f_{X|s}(x|s') dx \quad (50)$$

$$= \frac{\int_{c-\frac{d}{2}}^{c+\frac{d}{2}} f_{X|s}(x|s') dx}{\int_{c-\frac{d}{2}}^{c+\frac{d}{2}} f_{X|s}(x|s) dx} \quad (51)$$

This value is bounded above by $\kappa(c, d, s, s)$. The expected value of a bet can be no higher than its promised payout.

This bound does not apply when promised payments are computed on averaged probabilities and ex-interim prices are computed on probabilities that include information about means. To keep the contract price bounded above by the promised payment, I must define a way of translating shifts in mean to changes in price. I propose a function, $h_s: \mathbb{R}_+ \to [0, 1]$, which takes the ratio of the expected value of a bet in state s under the transparent mechanism to its associated promised payment, and maps this to a number between zero and 1. The function must satisfy the following conditions:

$$h_s(x) \in [0,1], \forall x \in \mathbb{R}^+ \quad (52)$$

$$h_s(0) = 0 \quad (53)$$

$$h_s\left(\frac{\kappa(c, d, s, s)}{\kappa(c, d, s, s)}\right) = \psi(d, s) \quad (54)$$

$$h'_s(x) > 0 \quad (55)$$

The state s' contract price for a promised payment in state s will be:

$$p(\kappa_b(d, s), s') = h_s\left(\frac{\kappa(c, d, s, s')}{\kappa(c, d, s, s)}\right) \kappa_b(d, s, s) \quad (56)$$

Equations (52) and (53) determine the bounds for the function. No matter how likely an outcome becomes under the transparent mechanism, the contract value cannot exceed the promised payout associated with the contract. Likewise, no matter how low the likelihood for an outcome, the contract value cannot be below zero. Condition (54) states that the function $h_s$ must be equal to the average probability when the current state is the same as the state in which the bet was placed. This ensures that if the state does not change, then the contract price is exactly equal to the original bet amount.

The invention claimed is:

1. A method of conducting a prediction market that obtains prediction market wagers from respective individuals, each wager representing belief of the respective individual as to the outcome of an event, and of extracting a measure of participant utility utilizing the prediction market wagers, the method comprising:
receiving data reflecting a first aggregate probability distribution representing a group forecast for the event, including receiving prediction market forecasts from respective individuals, each prediction market forecast reflecting a forecast from the respective individual for the event, and mathematically combining the data representing the prediction market forecasts from the respective individuals to obtain the data representing the first aggregate probability distribution;
receiving data reflecting a second probability distribution representing a forecast of a participant for the event, where the participant forecast is placed as a prediction market wager priced in a manner dependent on the first aggregate probability distribution at the time of the prediction market wager by the participant;
updating the first aggregate probability distribution responsive to the participant forecast;
using a microprocessor based system to calculate a region of difference between a curve representing the second probability distribution and a curve representing the first aggregate probability distribution;
determining the measure of participant utility based on the region of difference; and
performing at least one of applying the measure of participant utility to a subsequent prediction market computation or formatting the difference data into a browser-readable page for output to indicate a measure of utility of the participant.

2. The method of claim 1, where:
the method further comprises storing the measure in a database; and
the performing includes applying the measure to a subsequent prediction market computation, including in dependence on the measure, at least one of (a) adjusting a future forecast from the participant, (b) creating a virtual forecast from the participant for another event, (c) excluding the participant from a future prediction market, and (d) discarding a forecast from the participant for another event.

3. The method of claim 2, where storing the measure includes storing a time stamp representing time of the participant forecast.

4. The method of claim 2, where the database is a first database of a relational database, and where the method further comprises using a second database of the relational database, the second database identifying at least one affiliation for the participant.

5. The method of claim 4, further comprising aggregating measures for multiple participants based on affiliations from the second database, to develop an aggregated measure representing a participant subset, the participant subset representing the multiple participants.

6. The method of claim 1, where the method further comprises generating an aggregate forecast based on the updating of the first aggregate probability distribution, and providing data representing the aggregate forecast to at least one recipient for display via a web page.

7. The method of claim 1, further comprising revealing information reflecting the group forecast to the participant prior to the placing of the prediction market wager representing from the participant.

8. The method of claim 1, where:
the group forecast represents a first group;
the method further comprises repeating the receiving of data representing a participant forecast for each of plural different participants representing a second group;
using the microprocessor based system and determining the measure are performed such that the measure represents divergence of forecasts of the second group relative to the first aggregate probability distribution;
the method further comprises storing the measure representing divergence of forecasts of the second group relative to the first aggregate probability distribution.

9. The method of claim 8, further comprising restricting access to the measure representing divergence of forecasts of the second group conditioned upon authentication from a security database.

10. The method of claim 8, where performing comprises generating a report conditioned on receiving authorization to generate the report from a security database, the report dependent on the measure representing divergence of forecasts of the second group.

11. The method of claim 1, where:
receiving the data representing the first aggregate probability distribution includes at least one of receiving the data in a manner representing a first probability model type or converting received data to the first probability model type; and
receiving the data representing the second probability distribution includes at least one of receiving the data in a manner representing the first probability model type or converting received data to the first probability model type.

12. The method of claim 11, where the first probability model type is a student's-T distribution.

13. The method of claim 11, where using the microprocessor based system to calculate the region of difference of the second probability distribution relative to the first aggregate probability distribution includes determining crossing points between the second probability distribution and the first aggregate probability distribution.

14. The method of claim 11, where using the microprocessor based system to calculate the region of difference of the second probability distribution relative to the first aggregate probability distribution includes determining an area where the second probability distribution exceeds the first aggregate probability distribution.

15. The method of claim 11, where using the microprocessor based system to calculate the region difference of the second probability distribution relative to the first aggregate probability distribution includes subtracting at least part of (a) one of the first aggregate probability distribution or the second probability distribution, from (b) the other of the first aggregate probability distribution or the second probability distribution.

16. The method of claim 5, where the second database includes data that identifies a job function for each respective one of the multiple participants.

17. The method of claim 16, embodied as a method of forecasting at least one event associated with an enterprise, where each of the multiple participants is an employee of the enterprise and where the second database identifies enterprise personnel.

18. A prediction market apparatus adapted to obtain prediction market wagers from respective individuals, each wager representing belief of the respective individual as to the outcome of an event, and to extract a measure of participant utility, the prediction market apparatus comprising:
- an interface to receive data representing a group forecast for the event, and an interface to receive data representing a participant forecast for the event, where the group forecast is dependent on prediction market forecasts from multiple individuals, that each reflect a forecast from a respective one of the multiple individuals for the event, where the group forecast is expressed as a first aggregate probability distribution that represents a mathematical combination of data representing the prediction market forecasts to obtain the group forecast, and where the participant forecast is placed as a prediction market wager priced in a manner dependent on the first aggregate probability distribution;
- a calculation engine to
  - update the first aggregate probability distribution responsive to the participant forecast for the event, and
  - calculate a region of difference between a curve representing the first aggregate probability distribution and a curve representing a second probability distribution corresponding to the participant forecast for the event; and
- an application engine to perform at least one of applying the measure of participant utility to a subsequent prediction market computation or providing a least one of viewing or reporting of a measure of utility of the participant;
- where
  - the calculation engine is implemented by a microprocessor-based system, and
  - the measure of utility of the participant is determined dependent on the region of difference.

19. The prediction market apparatus of claim 18, where the interface to receive data representing the participant forecast includes a tool to obtain the prediction market wager from the participant.

20. The prediction market apparatus of claim 18, where the interface to receive data representing the group forecast includes a tool to obtain forecast data from each of multiple individuals representing the respective individual's forecast for the event and where the calculation engine is to convert the forecast data for the multiple individuals into the first aggregate probability distribution.

21. The prediction market apparatus of claim 20, where the application engine is to provide at least one of viewing or reporting of data representing the first aggregate probability distribution as updated.

22. The prediction market apparatus of claim 18, where the calculation engine includes code to convert at least one of the data reflecting the group forecast or the data representing the participant forecast to a common probability distribution type shared by both the first aggregate probability distribution and the second probability distribution.

23. The prediction market apparatus of claim 22, where the common probability distribution type is a student's T distribution, and where the calculation engine is to combine a first set of data identifying a first student's T distribution representing to the group forecast, with a second set of data identifying a second student's T distribution representing to the participant forecast.

24. The prediction market apparatus of claim 18, where:
- the prediction market apparatus further comprises storage to store data representing the first aggregate forecast as updated; and
- the application engine is further to provide a least one of viewing or reporting of the aggregate forecast as updated using the data stored by the storage.

25. The prediction market apparatus of claim 24, where:
- the prediction market wager is a first prediction market wager;
- the apparatus further comprises a storage to store at least a time stamp identifying the time of the participant forecast;
- the interface to receive data responsive to the participant forecast includes a tool to obtain the data representing the participant forecast as the first prediction market wager;
- the calculation engine is to price the first prediction market wager dependent upon the group forecast at a time indicated by the time stamp; and
- the calculation engine is to price a second prediction market wager subsequent to the first prediction market wager in a manner dependent upon the group forecast and the first prediction market wager.

26. The prediction market apparatus of claim 18, embodied as a computer with instructions that are stored on machine readable media.

27. The prediction market apparatus of claim 18, where the calculation engine and the application engine are embodied as instructions stored on machine readable media.

28. The prediction market apparatus of claim 18, embodied as plural network machines including at least one server.

29. An apparatus comprising instructions stored on non-transitory machine-readable media, the apparatus for use with a machine that is to construct a prediction market that obtains prediction market wagers from respective individuals, each wager representing belief of the respective individual as to the outcome of an event having an interface to receive data representing a group forecast for an event, and that is to extract a measure of participant utility utilizing the prediction market wagers, the apparatus having an interface to receive data representing to a participant forecast for the event, the participant forecast being placed as a prediction market wager priced in a manner dependent on a first aggregate probability distribution representing the group forecast, the instructions when executed by a machine to cause the machine to:
- calculate a region of difference between a curve representing the first aggregate probability distribution and a curve defining a second probability distribution representing the participant forecast for the event;
- store difference data dependent on the region of difference in storage readable by the machine;
- update the first aggregate probability distribution responsive to the participant forecast; and
- perform at least one of applying the measure of participant utility to a subsequent prediction market computation or format the difference data into a browser-readable page for output to indicate a measure of utility of the participant.

30. An improvement in a system for conducting a prediction market that obtains prediction market trades from respective individuals, each trade representing belief of the respective individual as to the outcome of an event, that combines the prediction market trades for the event to obtain a first aggregate probability distribution representing group belief as to outcome of the event, and that generates a forecast in dependence on the first aggregate probability distribution, where the system includes circuitry and software to interact with each respective individual to establish a price associated with the respective prediction market trade and to confirm a decision by the respective individual to place the prediction market trade subject to the price, the improvement comprising:

for at least one new prediction market trade from a participant, computing utility of a participant making the at least one new prediction market trade, by converting data representing the given prediction market trade to a second probability function, and determining a region of difference between a curve representing the second probability function and a curve representing the first aggregate probability distribution dependent on at least one of (i) points where the first aggregate probability distribution crosses the second probability function, (ii) a result of subtracting the first aggregate probability distribution and the second probability function, or (iii) a difference in area between the curve representing the first aggregate probability distribution and the curve representing the second probability function;

updating the first aggregate probability distribution responsive to the new prediction market trade from the participant; and performing least one of applying the measure of participant utility to a subsequent prediction market computation or formatting the difference data into a browser-readable page for output to indicate a measure of utility of the participant.

31. The improvement of claim 30, where determining difference includes determining difference using each of (i), (ii) and (iii).

32. The apparatus of claim 18, where:

the apparatus further comprises a database; and the at least one comprises one or more of (a) adjusting a future forecast from the participant, (b) creating a virtual forecast from the participant for another event, (c) excluding the participant from a future prediction market, and (d) discarding a forecast from the participant for another event.

* * * * *